(12) United States Patent
Lee et al.

(10) Patent No.: US 10,755,491 B2
(45) Date of Patent: Aug. 25, 2020

(54) ELECTRONIC DEVICE FOR TRANSMITTING RELAY MESSAGE TO EXTERNAL VEHICLE AND METHOD THEREOF

(71) Applicant: SAMSUNG ELECTRONICS CO., LTD., Suwon-si, Gyeonggi-do (KR)

(72) Inventors: Seungcheol Lee, Hwaseong-si (KR); Je-Hyun Lee, Seoul (KR); Ki-Ho Cho, Yongin-si (KR); Hyoung-Tak Cho, Yongin-si (KR); Jong-Sung Joo, Seoul (KR); A Reum Choi, Suwon-si (KR); In-Young Choi, Seoul (KR); Sun-Min Hwang, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/134,141

(22) Filed: Sep. 18, 2018

(65) Prior Publication Data

US 2019/0088041 A1 Mar. 21, 2019

(30) Foreign Application Priority Data

Sep. 19, 2017 (KR) .................. 10-2017-0120588

(51) Int. Cl.
*G07C 5/00* (2006.01)
*H04W 4/46* (2018.01)
(Continued)

(52) U.S. Cl.
CPC ............. *G07C 5/008* (2013.01); *G07C 5/085* (2013.01); *H04W 4/12* (2013.01); *H04W 4/46* (2018.02);
(Continued)

(58) Field of Classification Search
None
See application file for complete search history.

(56) References Cited

U.S. PATENT DOCUMENTS

| 7,215,953 B2 * | 5/2007 | Lee ........................ H04W 76/10 |
| | | 455/426.1 |
| 8,995,662 B2 | 3/2015 | Rubin et al. |
| (Continued) | | |

FOREIGN PATENT DOCUMENTS

| KR | 10-2009-0027853 | 3/2009 |
| KR | 10-2010-0103178 | 9/2010 |
| (Continued) | | |

OTHER PUBLICATIONS

Search Report and Written Opinion dated Dec. 19, 2018 in counterpart International Patent Application No. PCT/KR2018/010999.
(Continued)

*Primary Examiner* — Fekadeselassie Girma
(74) *Attorney, Agent, or Firm* — Nixon & Vanderhye P.C.

(57) ABSTRACT

According to various embodiments, an electronic device may include at least one sensor, at least one communication circuit, and a processor electrically connected to the at least one sensor and/or the at least one communication circuit, wherein the processor is configured to determine a relay message generation condition associated with a vehicle based at least on data acquired from the at least one sensor and/or the at least one communication circuit, to generate a relay message based at least on the data acquired from the at least one sensor and/or the at least one communication circuit when the relay message generation condition is satisfied based on the determination result, and to transmit the generated relay message to an external vehicle through the at least one communication circuit.

20 Claims, 16 Drawing Sheets

(51) Int. Cl.
*H04W 4/12* (2009.01)
*G07C 5/08* (2006.01)
*H04W 88/04* (2009.01)
*H04W 4/44* (2018.01)
*H04W 88/06* (2009.01)
*H04W 4/80* (2018.01)

(52) U.S. Cl.
CPC ............ *H04W 4/44* (2018.02); *H04W 4/80* (2018.02); *H04W 88/04* (2013.01); *H04W 88/06* (2013.01)

(56) References Cited

U.S. PATENT DOCUMENTS

| | | | | |
|---|---|---|---|---|
| 9,435,654 | B2* | 9/2016 | Ibrahim | G08G 1/0129 |
| 9,602,999 | B2* | 3/2017 | Kim | H04W 4/023 |
| 9,646,496 | B1* | 5/2017 | Miller | G08G 1/07 |
| 9,786,178 | B1* | 10/2017 | Bai | G08G 1/166 |
| 10,098,014 | B1* | 10/2018 | Shimizu | H04B 7/0617 |
| 10,210,762 | B1* | 2/2019 | Dotzler | G07C 5/008 |
| 10,231,187 | B1* | 3/2019 | Rubin | H04W 52/04 |
| 2011/0093162 | A1* | 4/2011 | Nielsen | G06Q 10/0631 701/31.4 |
| 2011/0238306 | A1* | 9/2011 | Miucic | G01C 21/28 701/469 |
| 2012/0105625 | A1* | 5/2012 | Richardson | G08G 1/164 348/135 |
| 2014/0369253 | A1 | 12/2014 | Jose et al. | |
| 2015/0170522 | A1 | 6/2015 | Noh | |
| 2015/0172956 | A1* | 6/2015 | Noh | H04W 74/0858 370/329 |
| 2016/0133128 | A1* | 5/2016 | Koo | G06K 9/00805 701/117 |
| 2016/0321924 | A1 | 11/2016 | Lewis et al. | |
| 2016/0381538 | A1* | 12/2016 | Tan | H04W 4/90 455/404.2 |
| 2017/0018182 | A1 | 1/2017 | Makled et al. | |
| 2017/0032402 | A1* | 2/2017 | Patsiokas | G06Q 30/0207 |
| 2017/0105104 | A1* | 4/2017 | Ulmansky | H04W 4/46 |
| 2017/0166115 | A1* | 6/2017 | Pal | G08G 1/149 |
| 2017/0330456 | A1* | 11/2017 | Miller | G08G 1/08 |
| 2017/0337571 | A1* | 11/2017 | Bansal | G07C 5/008 |
| 2017/0337816 | A1* | 11/2017 | Lu | G08G 1/166 |
| 2017/0365166 | A1* | 12/2017 | Lu | G08G 1/096783 |
| 2018/0018888 | A1* | 1/2018 | Townsend | B60Q 9/008 |
| 2018/0059779 | A1* | 3/2018 | Sisbot | G02B 27/01 |
| 2018/0083753 | A1* | 3/2018 | Nagaraja | H04B 7/0695 |
| 2018/0084440 | A1* | 3/2018 | Nagaraja | H04B 7/0617 |
| 2018/0084441 | A1* | 3/2018 | Nagaraja | H04L 5/0053 |
| 2018/0194352 | A1* | 7/2018 | Avedisov | B60W 30/09 |
| 2018/0288589 | A1* | 10/2018 | Punithan | H04W 4/46 |
| 2019/0020735 | A1* | 1/2019 | Joo | H04W 4/06 |
| 2019/0035277 | A1* | 1/2019 | Son | G08G 1/0965 |
| 2019/0037499 | A1* | 1/2019 | Son | G08G 1/161 |
| 2019/0053154 | A1* | 2/2019 | Song | G08G 1/005 |
| 2019/0056728 | A1* | 2/2019 | Lisewski | G07C 5/008 |
| 2019/0088041 | A1* | 3/2019 | Lee | G07C 5/008 |
| 2019/0272760 | A1* | 9/2019 | McQuillen | G08G 1/0968 |

FOREIGN PATENT DOCUMENTS

| | | |
|---|---|---|
| KR | 10-2015-0070801 | 6/2015 |
| KR | 10-2016-0021925 | 2/2016 |
| KR | 10-2017-0006859 | 1/2017 |
| WO | 2015/160859 | 10/2015 |

OTHER PUBLICATIONS

Selective message relaying for multi-hopping vehicular networks, XP 033052803; Dec. 8, 2016, IEEE Vehicular Networking Conference (VNC).

European Search Report dated Jul. 3, 2020 for European Application No. 18859143.2.

* cited by examiner

ELECTRONIC DEVICE FOR TRANSMITTING RELAY MESSAGE TO EXTERNAL VEHICLE AND METHOD THEREOF

CROSS-REFERENCE TO RELATED APPLICATION

This application is based on and claims priority under 35 U.S.C. § 119 to Korean Patent Application Serial No. 10-2017-0120588, which was filed in the Korean Intellectual Property Office on Sep. 19, 2017, the entire disclosure of which is incorporated by reference herein in its entirety.

TECHNICAL FIELD

The present disclosure relates to a method of transmitting a message associated with a vehicle from an electronic device to an external vehicle and an electronic device thereof.

BACKGROUND

Recently, techniques have been developed in which a moving means, such as a vehicle, communicates with other entities. The vehicle may include a communication circuit for communication and may transmit various information such as the speed of the vehicle, the steering direction thereof, whether the brake thereof is operated, etc., to other entities through the communication circuit. For example, the vehicle may transmit information to other vehicles and may receive information from other vehicles. Communication between the vehicles may be referred to as vehicle to vehicle (V2V) communication.

The vehicle may transmit information to a road side unit (RSU) or may receive information from the RSU. Communication between the vehicle and the RSU may be referred to as vehicle to infrastructure (V2I) communication. The vehicle may transmit information to electronic devices carried by pedestrians and may receive communication signals including safety related information from the electronic devices carried by the pedestrians. Communication between the vehicle and the electronic device carried by the pedestrians may be referred to as vehicle to pedestrian (V2P) communication.

Various methods for the communication between the vehicles are being discussed, for example, a dedicated short range communication (DSRC) technique based on 802.11p has been proposed. In the case of the above-described technique, a coverage capable of transmitting a basic safety message (BSM) transmitted between the vehicles may be limited within a certain distance (for example, 300 m to 1 km). For example, when it is necessary to transmit a vehicle to X (V2X) message (e.g., BSM) such as V2V, V2I, V2P, etc., to a vehicle that is distantly remote, it is difficult for the V2X message to be transmitted to the vehicle beyond the transmission coverage of the BSM.

SUMMARY

Various embodiments may provide a method of generating a relayable message and transmitting the generated relayable message to an external vehicle when information collected in a vehicle satisfies a designated condition, thereby efficiently transmitting a message related to a vehicle to a remote vehicle, and an electronic method thereof.

In order to address the aforementioned problems and/or other problems, an electronic device according to an embodiment may include at least one sensor; at least one communication circuit; and a electrically connected to the at least one sensor or the at least one communication circuit, wherein the processor is configured to determine a relay message generation condition associated with a vehicle based at least on data acquired from the at least one sensor and/or the at least one communication circuit, to generate a relay message based at least on the data acquired from the at least one sensor and/or the at least one communication circuit when the relay message generation condition is satisfied based on the determination result, and to transmit the generated relay message to an external vehicle through the at least one communication circuit.

An electronic device according to any one of various embodiments may include at least one communication circuit; and a processor electrically connected to the at least one communication circuit, wherein the processor is configured to determine whether a basic safety message (BSM) is a relay message from information included in the BSM received through the at least one communication circuit, to determine whether a relay condition included in the BSM is satisfied when the BSM is the relay message, to generate the relay message based on the received BSM when the relay condition is satisfied, and to transmit the generated relay message to an external vehicle through the at least one communication circuit.

In an operating method of an electronic device according to any one of various embodiments, a method of transmitting a relay message from an electronic device to an external vehicle may include determining a relay message generation condition associated with a vehicle based at least on data acquired from at least one sensor and/or at least one communication circuit; generating a relay message based at least on the data acquired from the at least one sensor and/or the at least one communication circuit when the relay message generation condition is satisfied based on the determination result; and transmitting the generated relay message to the external vehicle through the at least one communication circuit.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
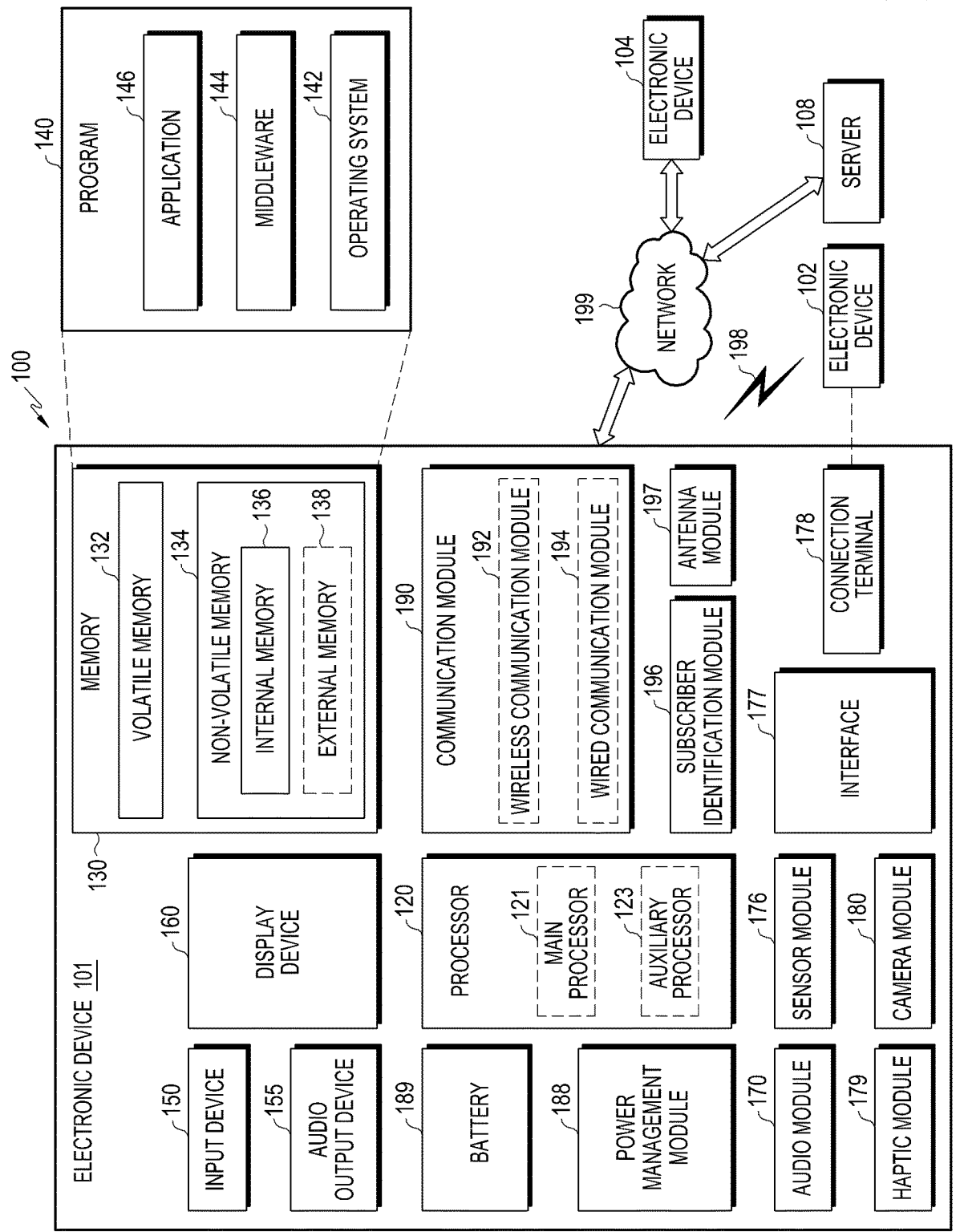
FIG. 1 is a block diagram illustrating an electronic device in a network environment according to an example embodiment.

Hereinafter, various example embodiments will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments may be used to refer to various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element). The expression "plural" may mean at least two.

The expression "configured to" as used in various embodiments may be interchangeably used with, for example, "suitable for", "having the capacity to", "designed to", "adapted to", "made to", or "capable of" in terms of hardware, software and/or firmware, or any combinations thereof, according to circumstances. In some situations, the expression "device configured to" may refer to a situation in which the device, together with other devices or components, "is able to". For example, the phrase "processor adapted (or configured) to perform A, B, and C" may refer, for example, and without limitation, to a dedicated processor (e.g., embedded processor) for performing the corresponding operations, a generic-purpose processor (e.g., Central Processing Unit (CPU), an Application Processor (AP), or the like) that can perform the corresponding operations by executing one or more software programs stored in a memory device.

An electronic device according to various embodiments may include, for example, and without limitation, at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and/or a wearable device, or the like. The HMD device may include at least one of an accessory type device (e.g., a watch, a ring, a bracelet, an ankle bracelet, a necklace, a pair of glasses, a contact lenses, a head mounted device (HMD), or a head mounted display (HMD)), a fabric or clothing integrated device (e.g., electronic clothing), a body attachment device (e.g., a skin pad or tattoo), and/or a bio-implantable circuit, or the like, but is not limited thereto. In some embodiments, the electronic device may include, for example, and without limitation, at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and/or an electronic photo frame, or the like.

In other embodiments, the electronic device may include, for example, and without limitation, at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, and/or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like.

According to some embodiments, an electronic device may include, for example, and without limitation, at least one of a part of furniture or a building/structure, an electronic board, an electronic signature receiving device, a projector, and/or various types of measuring instruments (e.g., a water meter, an electric meter, a gas meter, a radio wave meter, and the like), or the like. In various embodiments, the electronic device may be flexible, or may be a combination of one or more of the aforementioned various devices. The electronic device according to an embodiment is not limited to the above described devices. In the present disclosure, the term "user" may indicate a person using an electronic device or a device (e.g., an artificial intelligence electronic device) using an electronic device.

Various embodiments are directed to a method of transmitting a vehicle-related message (e.g., a Basic Safety Message (BSM)) transmitted from a vehicle to an external vehicle, and disclose a method capable of transmitting the vehicle-related message to a remote vehicle to overcome the restriction of the transmission coverage for the vehicle-related message and an electronic device thereof.

In the following disclosure, a message transmitted from the vehicle to the external vehicle may be referred to as a 'relay message' for convenience of explanation. However, the messages transmitted in the embodiments are not limited to the above terms, and may be used in various terms according to their use or related standards. According to various embodiments, the relay message may be configured using a message defined in the wireless access in vehicular environment (WAVE) standard of IEEE 802.11p, or may be configured such that the message defined in the standard includes relay-related information. For example, the relay message may be configured using the BSM, or may be configured such that a specific region of the BSM includes relay-related information. In addition, according to various embodiments, the relay message may be configured such that a message comprising various forms in addition to the message includes the relay-related information.

In the various embodiments described below, a "relay message transmission condition" may refer, for example, to a generation condition of a relay message for generating a relay message according to a designated condition in the electronic device, and may be referred to as "relay message generation condition". According to various embodiments, when the electronic device satisfies the relay message transmission condition, the electronic device may generate and transmit a relay message to an external vehicle, or relay-related information may be included in a message (e.g., BSM) transmitted from the electronic device to the external vehicle and transmitted, and thereby the external vehicle having received the transmitted message may retransmit the received message.

In various embodiments described below, the 'relay-related information' may, for example, and without limitation, include information on at least one 'relay condition'. For example, the 'relay condition' may include a condition for determining whether at least one external vehicle having received the relay message retransmits the received relay message to another external vehicle. According to various embodiments, the 'relay condition' may refer, for example, to a condition for retransmitting the received relay message to another external vehicle, and may be referred to as a 'relay transmission condition'.

FIG. 1 is a block diagram illustrating an electronic device in a network environment according to an example embodiment. Referring to FIG. 1, an electronic device 101 may communicate with an electronic device 102 via a first network 198 (e.g., short-range wireless communication) in a network environment 100, or may communicate with an electronic device 104 or a server 108 via a second network 199 (e.g., long-range wireless communication). According to an embodiment, the electronic device 101 may communicate with the electronic device 104 via the server 108. According to an embodiment, the electronic device 101 may include a processor 120, a memory 130, an input device 150, an audio output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, in the electronic device 101, at least one of these components may be omitted or another component may be added. In some embodiments, as in the sensor module 176 (e.g., a fingerprint sensor, an iris sensor, or an illuminance sensor) embedded in the display device 160 (e.g., a display), some components may be integrated and implemented.

The processor 120 may drive, for example, software (e.g., a program 140) to control at least one other components (e.g., hardware or software components) of the electronic device 101 connected to the processor 120, and to perform various data processing and computations. The processor 120 may load and process commands or data received from the other components (e.g., the sensor module 176 or the communication module 190) into a volatile memory 132, and may store the resulting data in a non-volatile memory 134. According to an embodiment, the processor 120 may include a main processor 121 (e.g., central processing device or application processor) and an auxiliary processor 123 (e.g., graphic processing device, image signal processor, sensor hub processor, or communication processor) which is operated independently of the main processor, and which additionally or alternatively uses lower power than that of the main processor 121 or is specialized in a designated function. Here, the auxiliary processor 120 may be separately operated from the main processor 121 or may be embedded therein.

In this case, the auxiliary processor 123 may control at least some of functions or states related to at least one (e.g., the display device 160, the sensor module 176, or the communication module 190) of the components of the electronic device 101, in place of the main processor 121, for example, while the main processor 121 is in an inactive (sleep) state or together with the main processor 121 while the main processor 121 is in an active (application execution) state. According to an embodiment, the auxiliary processor 123 (e.g., image signaling processor or communication processor) may be implemented as some components of functionally related other components (e.g., the camera module 180 or the communication module 190). The memory 130 may store various pieces of data used by at least one component (e.g., the processor 120 or the sensor module 176) of the electronic device 101, for example, software (e.g., the program 140) and input data or output data for a command related to the software. The memory 130 may include the volatile memory 132 or the non-volatile memory 134.

The program 140 may be software stored in the memory 130 and may include, for example, an operating system 142, middleware 144, or an application 146.

The input device 150 may be a device for receiving commands or data to be used for the components (e.g., processor 120) of the electronic device 101 from the outside (e.g., a user) of the electronic device 101, and may include, for example, a microphone, a mouse, or a keyboard.

The audio output device 155 may be a device for outputting a sound signal to the outside of the electronic device 101, and may include, for example, a speaker used for general use such as multimedia reproduction or recording reproduction and a receiver used only for telephone reception. According to an embodiment, the receiver may be formed integrally with or separately from the speaker.

The display device 160 may be a device for visually providing information to a user of the electronic device 101, and may include, for example, a display, a hologram device, or a projector, and a control circuit for controlling the corresponding device. According to an embodiment, the display device 160 may include a touch circuitry or a pressure sensor capable of measuring the intensity of the pressure with respect to a touch.

The audio module 170 may bidirectionally convert sound and electrical signals. According to an embodiment, the audio module 170 may acquire sound through the input device 150, or may output sound through the audio output device 155 or an external electronic device (e.g., the electronic device 102 (e.g., speaker or headphone)) which is connected by wire or wirelessly connected to the electronic device 101.

The sensor module 176 may generate an electrical signal or data value corresponding to an internal operating state (e.g., power or temperature) of the electronic device 101 or an external environmental condition. The sensor module 176 may include, for example, a gesture sensor, a gyro sensor, a barometric sensor, a magnetic sensor, an acceleration sensor, a grip sensor, a proximity sensor, a color sensor, an infrared (IR) sensor, a biosensor, a temperature sensor, a humidity sensor, or an illuminance sensor.

The interface 177 may support a designated protocol that can be wired or wirelessly connected to an external electronic device (e.g., the electronic device 102). According to an embodiment, the interface 177 may include a high definition multimedia interface (HDMI), a universal serial bus (USB) interface, an SD card interface, or an audio interface.

The connection terminal 178 may include a connector that can physically connect the electronic device 101 and an external electronic device (e.g., the electronic device 102), such as an HDMI connector, a USB connector, an SD card connector, or an audio connector (e.g., a headphone connector).

The haptic module 179 may convert electrical signals into mechanical stimuli (e.g., vibrations or movements) or electrical stimuli that can be perceived by a user through tactile or kinesthetic sensations. The haptic module 179 may include, for example, a motor, a piezoelectric element, or an electrical stimulation device.

The camera module 180 may capture a still image and a moving image. According to an embodiment, the camera module 180 may include one or more lenses, an image sensor, an image signal processor, or a flash.

The power management module 188 may be a module for managing power supplied to the electronic device 101, and may be configured as at least a portion of, for example, a power management integrated circuit (PMIC).

The battery 189 may be a device for supplying power to at least one component of the electronic device 101, and may include, for example, a non-rechargeable primary battery, a rechargeable secondary battery, or a fuel cell.

The communication module 190 may support establishment of a wired or wireless communication channel between the electronic device 101 and an external electronic device (e.g., the electronic device 102, the electronic device 104, or the server 108) and may support communication execution through the established communication channel. The communication module 190 may include one or more communication processors that are operated independently of the processor 120 (e.g., application processor) and support wired communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN)) communication module, and may communicate with an external electronic device using the corresponding communication module among the above-described communication modules, through a first network 198 (e.g., a short-range communication network such as Bluetooth, Wi-Fi, direct or infrared data association (IrDA)) or a second network 199 (e.g., a long-range communication network such as a cellular network, the internet, or a computer network (e.g., LAN or WAN)). The various types of communication modules 190 described above may be implemented as a single chip or may be implemented as separate chips.

According to an embodiment, the wireless communication module 192 may use user information stored in the subscriber identification module 196 to identify or authenticate the electronic device 101 within a communication network.

The antenna module 197 may include one or more antennas for transmitting or receiving signals or power to or from the outside. According to an embodiment, the communication module 190 (e.g., the wireless communication module 192) may transmit or receive signals to or from the outside electronic device via an antenna suitable for the corresponding communication scheme.

Some of the above-described components may be connected to each other via a communication scheme (e.g., bus, general purpose input/output (GPIO), serial peripheral interface (SPI), or mobile industry processor interface (MIPI)) between peripheral devices, and may exchange signals (e.g., commands or data) with each other.

According to an embodiment, the commands or data may be transmitted or received between the electronic device 101 and the external electronic device 104 via the server 108 connected to the second network 199. Each of the electronic devices 102 may be a device may be the same or a different kind of device as or from the electronic device 101. According to an embodiment, all or some of operations executed in the electronic device 101 may be executed in another electronic device or a plurality of other electronic devices. According to an embodiment, when the electronic device 101 is required to perform any function or service automatically or by a request, the electronic device 101 may request at least partial function associated with the function or the service from other devices additionally or in place of executing the function or the service by itself. The external electronic device having received the request may execute the requested function or additional function, and may transmit the execution result to the electronic device 101. The electronic device 101 may process the received result as is or additionally, and may provide the requested function or service. For this, for example, a cloud computing technology, a distributed computing technology, or a client-server computing technology may be used.

Figure 2:
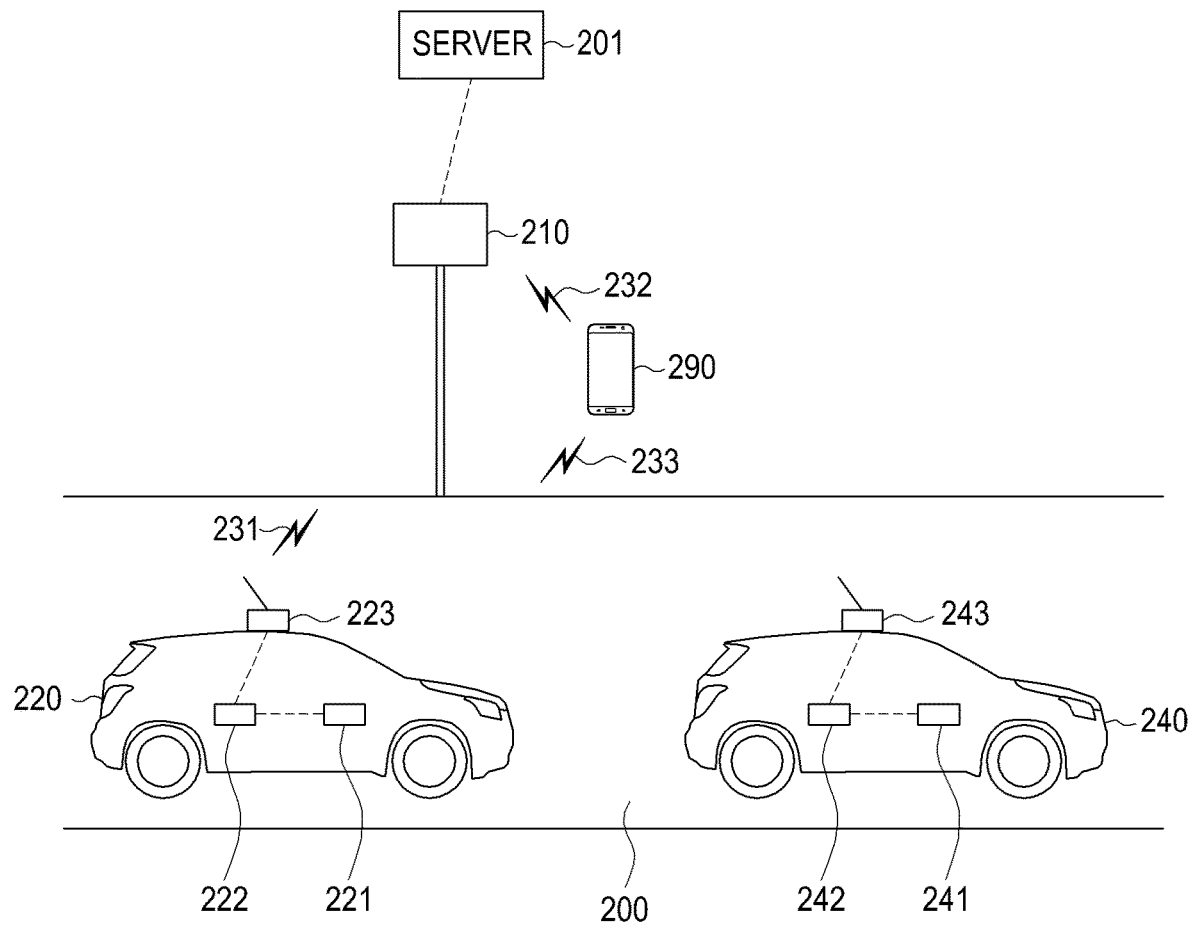
FIG. 2 is a diagram illustrating an electronic device, a vehicle, and a road side unit (RSU) according to various embodiments.

FIG. 2 is a diagram illustrating an electronic device, a vehicle, and a road side unit (RSU) according to various embodiments As illustrated in FIG. 2, at least one vehicle 220 or 240 may be located on a road 200. An RSU 210 may be located around the road 200. The vehicle 220 may include a terminal platform 221, a vehicle communication module (e.g., including communication circuitry) 222, and an antenna 223, and the vehicle 240 may include a terminal platform 241, a vehicle communication module (e.g., including communication circuitry) 242, and an antenna 243. The vehicle 220 may include, for example, at least some of the components of the electronic device 101 of FIG. 1. In this case, the terminal platform 221 may include the processor (e.g., including processing circuitry) 120, and the vehicle communication module 222 may include the communication module (e.g., including communication circuitry) 190. Accordingly, the fact that the vehicle 220 performs a particular operation may include that the electronic device 101 (e.g., the processor 120) performs a particular operation, may include that another hardware is set to perform a particular operation according to the control of the processor 120, or may include that an instruction that causes the processor 120 to perform a particular operation is stored in the memory 130.

The terminal platform 221 or 241 may control various operations of the vehicle 220 or 240 and may acquire various pieces of information associated with the vehicle 220 or 240. For example, the vehicle 220 or 240 may receive measurement data from various sensors such as a speed meter (not shown), an accelerometer (not shown), an azimuth meter (not shown), a brake detector (not shown), a position measuring device (e.g., a global positioning system (GPS) module) (not shown), or a road surface condition detector (not shown). The vehicle 220 or 240 (e.g., the terminal platform 221 or 241) may generate transmission data based on the received measurement data.

According to various embodiments, the terminal platform 221 or 241 may generate transmission data (or a message) based on information (e.g., identification information of the vehicle 220 or 240, the size of the vehicle 220 or 240, or capability-related information of the vehicle 220 or 240) included in a memory (not shown) within the vehicle 220 or 240. For example, the vehicle communication module 222 may generate a signal corresponding to a communication signal using the transmission data and may provide the generated signal to the antenna 223. The antenna 223 may transmit a communication signal 231 to a peripheral entity (e.g., the RSU 210, a mobile terminal device 290, or another vehicle 240) using the received signal. The communication signal 231 may include various types of information such as the speed of the vehicle 220, the acceleration of the vehicle 220, the azimuth direction of the vehicle 220, whether a brake thereof is operated, the position of the vehicle 220, road surface detection information, and the like. For example, the vehicle 220 may transmit the transmission signal 231 defined in a wireless access in vehicular environment (WAVE) scheme, and may use a frequency band using a designated frequency (e.g., 5.8 GHz) as a center frequency.

According to various embodiments, the vehicle 220 may enable a message set, a data frame, and a data element associated with an application for implementing the WAVE scheme, to be included and generated in a basic safety message (BSM) defined in a specific society of automotive engineers (SAE) standard (e.g., document J2735), and may enable the generated BSM to be included in the communication signal 231 to transmit the resulting data. The BSM may include information associated with the location of the vehicle 220 (e.g., latitude, longitude, altitude, or location accuracy) and information associated with the movement thereof (e.g., speed, heading, steering wheel angle, acceleration set, control information (e.g., brake status), or basic information (e.g., Part 1 information) of a basic transportation means (e.g., the size of the transportation means)), and in some cases, may further include additional information (e.g., Part 2 information). The types of the information included in the BSM are simply examples and may be changed according to a change in the standard. The vehicle 220 according to various embodiments may transmit the communication signal 231 including information having the same information type as the information type defined in the BSM, or may transmit the communication signal 231 including information having at least partially different information type from the information type defined in the BSM.

According to various embodiments, the vehicle 220 may transmit the communication signal 231 based, for example, and without limitation, on the transmission period, transmission frequency, and/or transmission intensity, or the like, defined in the relevant standard, but this is merely an example. Those skilled in the art will readily understand that there is no limitation on transmission conditions (e.g., transmission period, transmission frequency, or transmission strength) of the communication signal 231. The vehicle 220 may transmit the communication signal 231 including the BSM in a usual manner, but may enable various messages such as common safety request (CSR), emergency vehicle alert (EVA), intersection collision avoidance (ICA), etc., to be included in the communication signal 231 according to various conditions and transmit the resulting data.

According to various embodiments, the communication signal 231 transmitted by the antenna 223 may include a contextual awareness message (CAM) according to the standard applied to the vehicle 220. The vehicle 220 may broadcast, unicast, or multicast the communication signal 231 to another vehicle 240, the RSU 210, or the electronic device 101 via the antenna 223. At least one of the terminal platform 221, the vehicle communication module 222, and the antenna 223 included in the vehicle 220 may be referred to as an onboard unit (OBU).

According to various embodiments, the RSU 210 may receive the communication signal 231 from the vehicle 220 and may extract information from the received communication signal 231. The RSU 210 may be located around the road 200 and may be disposed at a point where the safety of pedestrians is required such as crosswalks, traffic lights, or intersections or at a point where the risk of an accident of the vehicle 220 is relatively high. According to various embodiments, the RSU 210 may be disposed so that there is no shadow area. According to various embodiments, the RSU 210 may enable at least one of the received information and analysis results of the received information to be included in the communication signal 232 to broadcast the resulting data around, or may transmit the at least one of the received information and the analysis results of the received information to a server 201.

According to various embodiments, the server 201 may perform management of the RSU 210, vehicle information collection, traffic information collection, or traffic image information providence. The RSU 210 may determine various situations (e.g., an accident situation, a vehicle failure, a dangerous situation of a vehicle or a pedestrian, etc.) based on the information from the vehicle 220, and may transmit the communication signal 232 including the determined various situations to a vehicle (e.g., the vehicle 220 or the vehicle 240) or the mobile terminal device 290. The RSU 210 may broadcast, unicast, or multicast the communication signal 232 including at least one of identification information of the RSU 210, location information of the RSU 210, information associated with neighboring vehicles, and information associated with peripheral pedestrians with respect to peripheral entities. The RSU 210 may transmit warning information or the like depending on situations. The RSU 210 may control a landmark (e.g., a traffic light) located in a traffic zone according to the received information.

For example, a pedestrian may be located around the road 200 while carrying the mobile terminal device 290. According to various embodiments, the mobile terminal device 290 may transmit, to the vehicle 220 or 240 or the RSU 210, a communication signal 233 including information (e.g., location, speed, heading, acceleration, path history information, information associated with whether a pedestrian is aboard the corresponding vehicle, pedestrian behavior information, crosswalk crossing information, pedestrian cluster size information, work-related information, obstacle-related information, pedestrian-related information, pedestrian attachment entity information, or the like) acquired by the mobile terminal device 290. The mobile terminal device 290 may generate the communication signal 233 using information acquired through various sensors (e.g., the sensor module 176) included therein, information acquired through the input device 150, information acquired through the touch circuit included in the display device 160, or information acquired through the communication module 190. For example, the mobile terminal device 290 may enable a personal safety message (PSM) defined in the SAE standard (e.g., document J2735) to be included in the communication signal 233 and may transmit the resulting data. The PSM may include, for example, information (e.g., unavailable, pedestrian, pedal cyclist, public safety worker, animal, etc.) about the type of a user.

According to various embodiments, the PSM may include, for example, time stamp information in which a message is generated. For example, the PSM may include message count information indicating the number of messages generated by an object that generates the message. The PSM may include, for example, identifier information (e.g., fixed identifier or floating identifier) for communication. According to various embodiments, the PSM may include information (e.g., at least one of latitude, longitude, and altitude) about the location of the mobile terminal device 290, and may represent the information about the location in a unit (cm, $\frac{1}{10}$ micro degree, or $\frac{1}{10}$ micro degree) of, for example, the world geodetic system (WGS), but it is not limited as long as it can represent the location (for example, three-dimensional (3D) location).

According to various embodiments, the PSM may include accuracy information about the location of the mobile terminal device 290. The PSM may include, for example, information about the speed. The PSM may include, for example, information about heading. According to various embodiments, in the WAVE standard, the above-described various types of information may be designated as information that is necessarily included in the PSM, but the mobile terminal device 290 according to various embodiments may transmit the communication signal that does not include at least some of the above-described various types of information. For example, the information included in the communication signal transmitted by the mobile terminal device 290 according to various embodiments is not limited.

According to various embodiments, the PSM may include, for example, axis-specific acceleration information. The PSM may include, for example, information about the history of a path on which the mobile terminal device 290 travels. The PSM may include, for example, information about the type of propulsion (e.g., human propelled type, animal propelled type, or motorized propelled type). The PSM may include, for example, information about a use state, and the information about the use state may represent information associated with the performing operation of the mobile terminal device 290. A parameter of the use state may include at least one of parameters such as unavailable, other, idle, listening to audio except for telephone, typing, calling, playing game, reading, content viewing, and the like. The reading may be a state in which a content having relatively small screen change over time, such as a content of e-book or a content of web browser, is displayed. The content viewing may be a state in which a content such as a moving image having relatively large screen change over time is displayed.

According to various embodiments, the mobile terminal device 290 may determine its use state based on the type of a currently displayed content, whether an audio output is currently performed, the type of a currently executed application, whether an input is performed through an input device, or the like. The PSM may include, for example, information indicating whether the mobile terminal device 290 requests crossing a crosswalk or information indicating that the mobile terminal device 290 is crossing. The PSM may include, for example, information about a cluster size. The PSM may include, for example, information about event responder types (e.g., tow operator, emergency medical service worker, department of transport worker, law enforcement worker, hazmat responder, animal control worker, etc.). The PSM may include, for example, information about activity types (e.g., police, traffic arrangement manager, military, or emergency manager, etc.). The PSM may include, for example, information about assist types (e.g., information about disabilities such as visual impairment, hearing impairment, behavioral impairment, mental impairment, etc.). The PSM may include, for example, information about sizing (e.g. whether it is an adult or a child, or whether it is obscured by surrounding features). The PSM may include, for example, information about the attachment (e.g., a baby carriage, a cart, or a wheelchair). According to various embodiments, the information about the attachment may include information about the location of a vehicle on which the mobile terminal device 290 is mounted. The PSM may include, for example, information about the size of the attachment. The PSM may include, for example, information about animal types (e.g., blind guide dog). According to various embodiments, the types of information included in the PSM are examples and may be changed according to a change in the standard.

The mobile terminal device 290 according to various embodiments may transmit the communication signal 233 including information having the same information type as the information type defined in the PSM, or may transmit the communication signal 233 including information having at least partially different information type from the information type defined in the PSM. The mobile terminal device 290 may transmit the communication signal 233 based on the transmission period, transmission frequency, or transmission intensity defined in the relevant standard, but this is merely an example. Those skilled in the art will readily understand that there is no limitation on transmission conditions (e.g., transmission period, transmission frequency, or transmission strength) of the communication signal 233. The mobile terminal device 290 may broadcast, unicast, or multicast the communication signal 233 to the vehicle 220 or the RSU 210.

In various embodiments, when a designated condition is satisfied, the mobile terminal device 290 may be configured to transmit the communication signal 233. When the designated condition is unsatisfied, the mobile terminal device 290 may not transmit the communication signal 233, thereby saving battery power. For example, when it is determined that the current location of the mobile terminal device 290 is a predetermined region, the mobile terminal device 290 may transmit the communication signal 233 including the PSM. The RSU 210 may transmit pedestrian-related information to neighboring vehicles, and other vehicles may carry out operations for pedestrian safety using the transmitted pedestrian-related information. The vehicle 220 or 240 that has received the communication signal 233 directly from the mobile terminal device 290 may provide the information included in the communication signal 233, or may control the traveling for pedestrian safety based at least on the information included in the communication signal 233.

Figure 3:
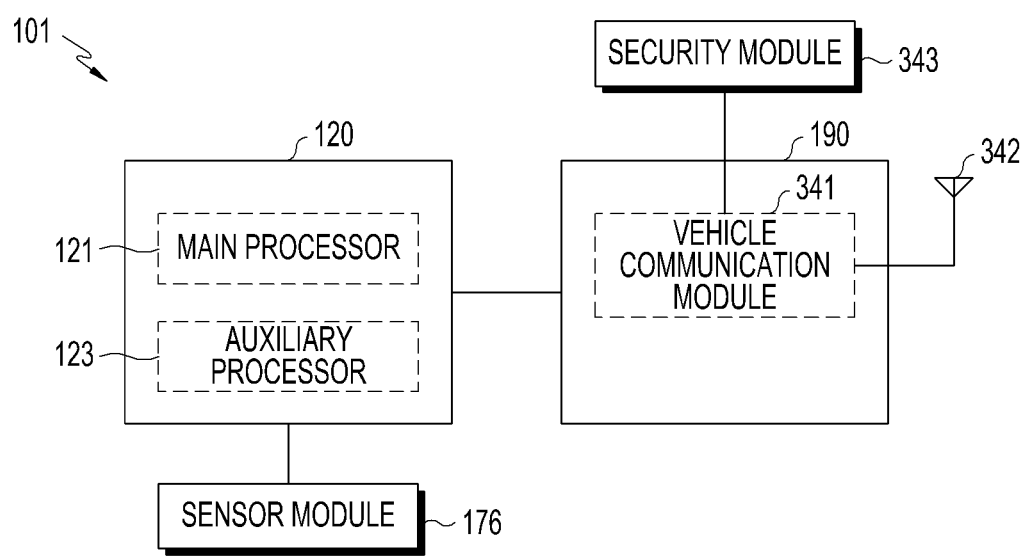
FIG. 3 is a block diagram illustrating an electronic device according to various embodiments.

FIG. 3 is a block diagram illustrating an electronic device according to various embodiments.

Referring to FIG. 3, the communication module (e.g., including communication circuitry) 190 may include a vehicle communication module (e.g., including vehicle communication circuitry) 341, and the vehicle communication module 341 may be connected to an antenna 342 for a vehicle communication module. The antenna 342 for the vehicle communication module may be included, for example, in an antenna module 197. The electronic device 101 may include a security module (e.g., including security circuitry and/or storage elements) 343. As described above, the electronic device 101 may be included in the vehicle 220 or 240 or the mobile terminal device 290. The processor 120 (e.g., the main processor 121) may control the overall operations of the electronic device 101. For example, as instructions stored in the memory 130 are executed, at least one piece of hardware may be controlled to perform operations corresponding to the instructions.

According to various embodiments, the main processor 121 may include various processing circuitry and (e.g., an application processor (AP)) may have either a sleep state or a wake-up state. In the sleep state, the main processor 121 may not perform any operation, so that battery consumption by the main processor 121 may be reduced. The main processor 121 may be switched into the wake-up state using various conditions as triggers, and may operate in accordance with the instructions stored in the memory 130 in the wake-up state.

According to various embodiments, the main processor 121 may provide information associated with the traveling of other vehicles based on information included in the communication signal received through the communication module 190. The main processor 121 may store, for example, information associated with the traveling of the vehicle in the memory 130 for each piece of identification information. When the identification information of the vehicle is updated, the main processor 121 may associate existing identification information with new identification information, and may connect data corresponding to the existing identification information to data corresponding to the new identification information to store the resulting data in the memory 130. The main processor 121 may acquire various types of information, such as data from various sensors included in the sensor module 176, for example, an acceleration sensor, a gyro sensor, a geomagnetic sensor, etc., data from a device of measuring the coordinate position of a GPS module, image analysis results acquired by the camera module 180, and the like.

According to various embodiments, the main processor 121 may control the vehicle communication module 341 and the antenna 342 for the vehicle communication module to transmit the communication signal including the acquired information. Although not shown, a front end module (FEM) may be connected to a space between the vehicle communication module 341 and the antenna 342 for the vehicle communication module. When the main processor 121 is in the sleep state, the auxiliary processor 123 may include various processing circuitry (e.g., the sensor hub processor) and may perform the operation of the main processor 121 described above.

According to various embodiments, the vehicle communication module 341 may support a WAVE communication scheme and may transmit the communication signal including, for example, PSM or BSM, via the antenna 342 for the vehicle communication module. In various embodiments, the electronic device 101 may be aboard the vehicle, or the electronic device 101 may be electrically connected to the vehicle. For example, the vehicle communication module 341 may transmit the communication signal including the BSM through the antenna 342 for the vehicle communication module. The vehicle communication module 341 may receive the communication signal including the BSM or the PSM from other entities, and may provide the received communication signal to the processor 120. The vehicle communication module 341 may process the communication signal (e.g., communication signal including the BSM from the vehicle) received from the outside via the antenna 342 for the vehicle communication module, and may transmit the processed communication signal to the processor 120.

According to various embodiments, the vehicle communication module 341 may be implemented as a chip set capable of performing various communication such as Wi-Fi communication, Bluetooth communication, etc., in addition to WAVE communication. For example, the vehicle communication module 341 may be implemented as a chipset capable of performing both data processing for Wi-Fi and data processing (e.g., data for WAVE) associated with vehicle safety. For example, the vehicle communication module 341 may be implemented as a chipset capable of performing both data processing for Wi-Fi and data processing associated with vehicle safety (e.g., data for WAVE). For example, the vehicle communication module 341 may be implemented as a chipset designed to process data by IEEE 802.11a/b/n/p. In addition, the antenna 342 for the vehicle communication module may perform transmission/reception of the communication signal for Wi-Fi and transmission/reception of the communication signal associated with vehicle safety (e.g., communication signal for WAVE).

According to various embodiments, the communication signal for Wi-Fi may use a frequency band having a center frequency of a designated frequency (e.g., 5 GHz), and the communication signal for WAVE may use a frequency band having a center frequency of a frequency (e.g., 5.8 GHz) having a relatively small difference with the frequency band for Wi-Fi, so that the antenna 342 for the vehicle communication module may perform both transmission and reception of the two communication signals. Although the antenna 342 for the vehicle communication module is shown as being one antenna, this is merely an example, and thus a plurality of antennas may be implemented as required by the communication standard. When the vehicle communication module 341 supports a plurality of communication schemes, the vehicle communication module 341 may be connected to the corresponding antenna for each of a plurality of communication schemes.

According to various embodiments, the communication schemes having similar frequencies (e.g., Wi-Fi communication in a 5 GHz band and a WAVE communication in a 5.8 GHz) among the plurality of communication schemes may share an antenna. The security module 343 may include various security circuitry and/or storage elements and store information required for data processing for WAVE, and the vehicle communication module 341 or the processor 120 may process data for WAVE using the stored information. For example, the security module 343 may store various types of information such as information used for WAVE modulation/demodulation, information used for encryption/decryption, information used for processing a message, and the like. For example, the vehicle communication module 341 or the processor 120 may access the security module 343 directly or indirectly.

According to various embodiments, the security module 343 may be implemented integrally with the memory 130 or may be implemented as different hardware, depending on the implementation. The security module 343 may be included in the communication module 190 or the vehicle communication module 341 depending on the implementation. The vehicle communication module 341 may receive data from the main processor 121 or the auxiliary processor 123 and processes the received data to generate a signal corresponding to the communication signal for WAVE, and may provide the generated signal to the antenna 342 for the vehicle communication module. For example, when the main processor 121 is in the wake-up state, the vehicle communication module 341 may receive data from at least one of the main processor 121 and the auxiliary processor 123. When the main processor 121 is in the sleep state, the vehicle communication module 341 may receive data from the auxiliary processor 123. The auxiliary processor 123 may include at least one of a processing circuit capable of acquiring data from at least one of sensors (e.g., an acceleration sensor, a gyro sensor, or a geomagnetic sensor) and a GPS module and a storage circuit capable of temporarily or non-temporarily storing the acquired data.

According to various embodiments, the vehicle communication module 341 may include at least one of a processing circuit capable of processing the communication signal for WAVE, a transmission circuit capable of transmitting the communication signal, and a reception circuit capable of receiving the communication signal. The vehicle communication module 341 may perform scanning for receiving the communication signal every designated period, may analyze the result of the scanning, and may operate even when the main processor 121 is in the sleep state. The vehicle communication module 341 may receive the communication signal and may wake up the main processor 121 when the data included in the communication signal satisfies a designated condition. The vehicle communication module 341 may include a transmission circuit for transmitting the communication signal and a reception circuit for processing the communication signal from other electronic devices. For example, the electronic device 101 may selectively activate the transmission circuit or the reception circuit. For example, the electronic device 101 may deactivate the transmission circuit and may activate the reception circuit to thereby scan the communication signal from other entities even without transmitting the communication signal. In this document, an arbitrary module for performing communication may be referred to as a communication circuit.

According to various embodiments, the processor 120 may receive the communication signal including the BSM or the PSM. When the main processor 121 is in the sleep state, the auxiliary processor 123 may process the BSM or PSM included in the received communication signal to manage the information included therein. The auxiliary processor 123 or the vehicle communication module 341 may wake up the main processor 121 when it is detected that the designated condition is satisfied. The processor 120 may manage the information for each identification information, and may associate, when the identification information is changed, data received together with other identification information with data received together with the existing identification information. Meanwhile, when the electronic device 101 is included in a means capable of supplying sufficient power, as in the vehicle 220, the electronic device 101 may not include the auxiliary processor 123 for a low power mode.

According to various embodiments, the processor 120 may display various graphical objects (e.g., a graphic user interface (GUI)) associated with vehicle safety on the display device 160. In various embodiments, the processor 120 may display, on the display device 160, a content indicating at least one of the movement and location of another vehicle, which is generated based on at least a portion of information included in the BSM received from the other vehicle. For example, the processor 120 may display, on the display device 160, contents corresponding to other vehicles, together with a navigation execution screen. The audio module 170 may output vehicle-related warning sound or the like. According to various embodiments, the processor 120 may display, on the display device 160, information (e.g., notification message) associated with a relay message received from another external vehicle in the form of, for example, text or an image, or may notify a driver of the information associated with the relay message in various methods (e.g., sound or warning sound) through the audio module 170.

According to various embodiments, when receiving the relay message from another external vehicle through the communication module 190, the processor 120 may control the designated function of the electronic device 101 (e.g., vehicle) based on the information associated with the received relay message. For example, the processor 120 of the electronic device 101 may perform vehicle control such as controlling a brake based on the received relay message, controlling the speed of the vehicle, or automatically blinking an emergency light.

According to various embodiments, the camera module 180 may capture an image, and the processor 120 may determine whether transmission/reception of the communication signal for WAVE is activated using the image received from the camera module 180. An acceleration sensor included in the sensor module 176 may sense the acceleration of the electronic device 101, a gyro sensor may sense rotation information, and a geomagnetic sensor may sense geomagnetic information. The processor 120 may enable corresponding information to be included in the communication signal (e.g., communication signal including BSM or PSM) to be transmitted through the vehicle communication module 341 by using data from various sensors (e.g., an acceleration sensor, a gyro sensor, a geometric sensor, etc.) or the GPS module.

Figure 4:
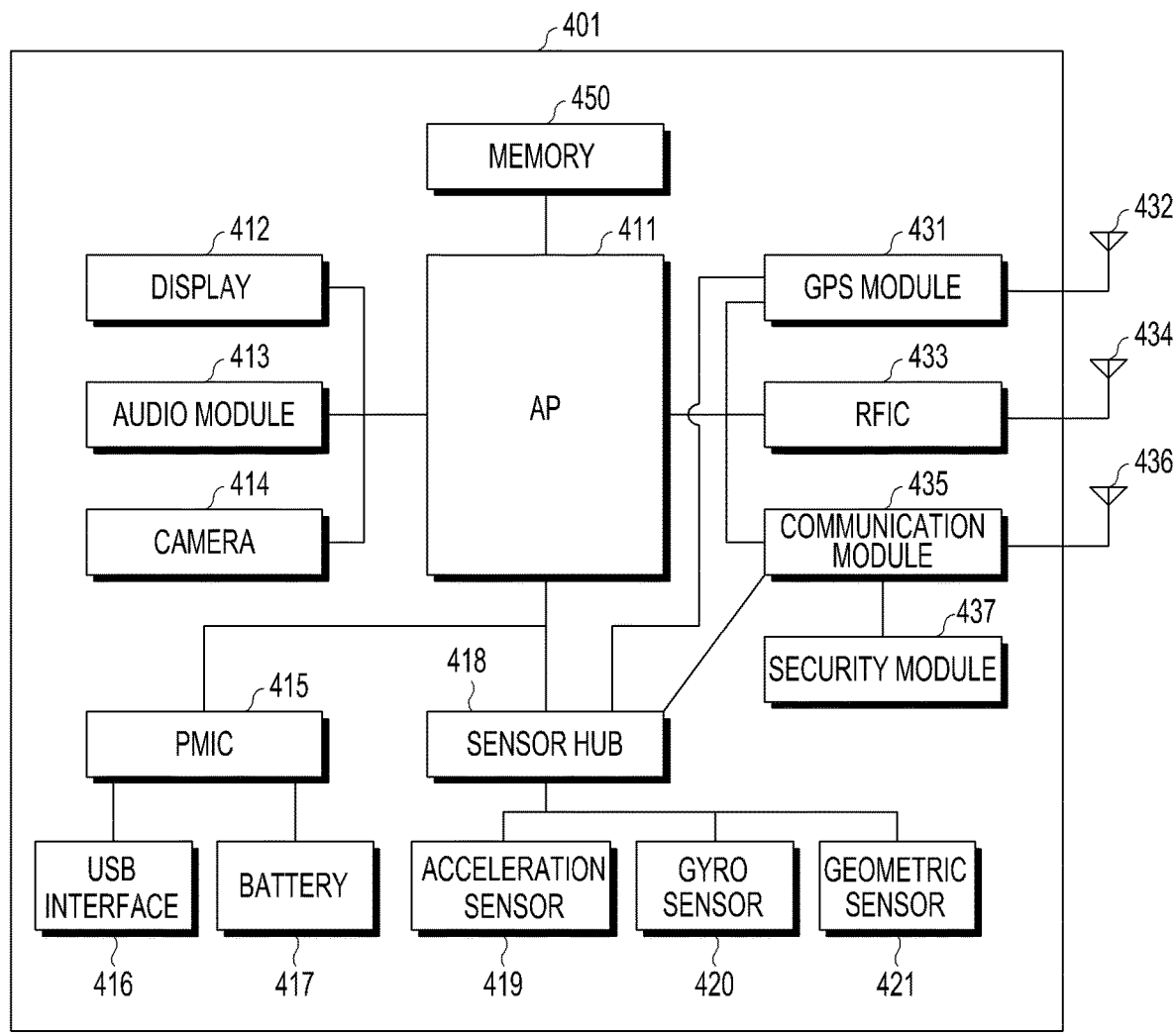
FIG. 4 is a block diagram illustrating an electronic device according to various embodiments.

FIG. 4 is a block diagram illustrating an electronic device according to various embodiments.

Referring to FIG. 4, an electronic device 401 (e.g., the electronic device 101 of FIG. 1, or the electronic device 290 or the vehicle 220 or 240 of FIG. 2) may include an application processor (e.g., including processing circuitry) (AP) 411, a display 412, an audio module (e.g., including audio circuitry) 413, a camera 414, a PMIC (e.g., including power management circuitry) 415, a USB interface (e.g., including USB interface circuitry) 416, a battery 417, a sensor hub 418, an acceleration sensor 419, a gyro sensor 420, a geometric sensor 421, a GPS module (e.g., including GPS circuitry) 431, an antenna 432 for a GPS, an RFIC (e.g., including radio frequency circuitry) 433, an antenna 434 for an RFIC, a communication module (e.g., including communication circuitry) 435, an antenna 436 for a communication module, a security module (e.g., including security circuitry and/or storage elements) 437, and a memory 450.

According to various embodiments, the AP 411 (e.g., the main processor 121) may provide control to perform the overall operations of the electronic device 401. For example, as a command stored in the memory 450 (e.g., the memory 130) is executed, at least one piece of hardware may be controlled to perform an operation corresponding to the command. The AP 411 may have either a sleep state or a wake-up state. In the sleep state, the AP 411 may not perform any operation, and thereby battery consumption by the AP 411 may be reduced. The AP 411 may be switched to an automatic activation (wake-up) state using various conditions as triggers, or may be switched to any one state of various states of the electronic device 401. The various states may be states associated with at least one of transmission and reception of at least one of PSM and BSM. According to various embodiments, when the electronic device 401 is a moving means (e.g., a vehicle), the AP 411 may, for example, and without limitation, be a micro controller unit (MCU) and may be configured to include at least some functions of the MCU.

According to various embodiments, in the automatic activation (wake-up) state, the AP 411 may operate in accordance with the commands stored in the memory 450. The AP 411 may acquire various types of information such as data from various sensors such as the acceleration sensor 419, the gyro sensor 420, the geometric sensor 421, etc., data from the GPS module 431, and image analysis results acquired by the camera 414. The AP 411 may control the communication module 435 and the antenna 436 for the communication module to transmit a communication signal including the acquired information. Although not shown, an FEM may be connected to a space between the communication module 435 and the antenna 436 for the communication module.

According to various embodiments, the communication module 435 may be implemented as a chipset capable of performing both data processing for Wi-Fi and data (e.g., data for WAVE) processing associated with vehicle safety. For example, the communication module 435 may be implemented as a chipset designed to process data by IEEE 802.11a/b/n/p. For example, the antenna 436 for the communication module may perform transmission/reception of the communication signal for Wi-Fi and transmission/reception of the communication signal associated with vehicle safety (e.g., communication signal for WAVE). For example, the communication signal for Wi-Fi may use a frequency band having a center frequency of 5 GHz, and the communication signal for WAVE may use a frequency band having a center frequency of 5.8 GHz having a relatively small difference with the frequency band for Wi-Fi, so that the antenna 436 for the communication module may perform both transmission and reception of the two communication signals. Although the antenna 436 for the communication module is shown as being one antenna, this is merely an example, and thus a plurality of antennas may be implemented as required by the communication standard.

According to various embodiments, the security module 437 may store information required for data processing for WAVE, and the communication module 435 may process data for WAVE using the stored information. For example, the security module 437 may store various types of information such as information used for WAVE modulation/demodulation, information used for encryption/decryption, information used for processing a message, and the like. For example, the communication module 435, the AP 411, or the sensor hub 418 may access the security module 437 directly or indirectly. The security module 437 may be implemented integrally with the memory 450 or may be implemented as different hardware, depending on the implementation.

According to various embodiments, the communication module 435 may receive data from the AP 411, may process the received data, and may generate an electrical signal corresponding to the communication signal for WAVE to provide the generated electrical signal to the antenna 436 for the communication module. The communication module 435 may receive data from the sensor hub 418, may process the received data, and may generate an electrical signal corresponding to the communication signal for WAVE to provide the generated electrical signal to the antenna 436 for the communication module. For example, when the AP 411 is in an automatic activation (wake-up) state, the communication module 435 may receive data from at least one of the AP 411 and the sensor hub 418. When the AP 411 is in a sleep state, the communication module 435 may receive data from the sensor hub 418. The sensor hub 418 (e.g., the auxiliary processor 123) may include at least one of a processing circuit capable of acquiring and processing data from at least one of sensors (e.g., the acceleration sensor 419, the gyro sensor 420, the geometric sensor 421, etc.) and the GPS module 431, and a storage circuit capable of temporarily or non-temporarily storing the acquired and processed data.

According to various embodiments, the communication module 435 may include at least one of a processing circuit capable of processing the communication signal for WAVE, a transmission circuit capable of transmitting the communication signal, and a reception circuit capable of receiving the communication signal. The communication module 435 may perform scanning for receiving the communication signal every designated period, may analyze the result of the scanning, and may operate even when the AP 411 is in the sleep state.

According to various embodiments, the communication module 435 may receive the communication signal and may automatically wake-up the AP 411 when the data included in the communication signal satisfies a designated condition. In a case in which the AP 411 is in the sleep state in a general Wi-Fi operation, the AP 411 may be automatically activated (woken up) when a connection has been made even once or the communication signal is received from an access point having a designated condition. Since information about the designated condition or the connected access point may be updated, information of the storage of the communication module 435 may be changed by the AP 411 when updating is required, and the communication module 435 may operate by the changed information.

According to various embodiments, the communication module 435 may include a transmission circuit for transmitting the communication signal and a reception circuit for processing the communication signal from another electronic device. The electronic device 101 may selectively activate the transmission circuit and the reception circuit. For example, the communication signal from another entity may be scanned without transmitting the communication signal by deactivating the transmission circuit and activating the reception circuit. In this document, an arbitrary module (e.g., the communication module 435 or the vehicle communication module) for performing communication may be referred to as a communication circuit.

According to various embodiments, it is determined that the current location of the electronic device 101 corresponds to a dangerous area and that the electronic device 101 is located outside the vehicle 220, the AP 411 or the sensor hub 418 may correspondingly activate the transmission circuit of the communication module 435 and may control to transmit the communication signal (e.g., communication signal including PSM or BSM) including data acquired through the activated transmission circuit.

According to various embodiments, the AP 411 or the sensor hub 418 may provide control to transmit the communication signal using at least a portion of geographic information for a particular area. For example, when the electronic device 401 enters a particular area, geographic information for the particular area may be received via an RSU (e.g., the RSU 210) or a server and may be stored in the memory 450. In various embodiments, the memory 450 may store information about a dangerous area. The geographic information according to various embodiments may be data represented by a numerical value associated with at least one of a designated latitude, longitude, and altitude, or data in the form of an image.

According to various embodiments, when it is determined that the location information of the electronic device 401 identified through the GPS module 431 belongs to a designated location (for example, a dangerous area, etc.), the AP 411 or the sensor hub 418 may control the communication module 435 to transmit the communication signal. When the AP 411 is in the sleep state, the sensor hub 418 may receive and store only at least a portion of the geographic information for the particular area from the memory 450, and may compare the stored geographic information with the current location of the electronic device 401 identified through the GPS module 431. The sensor hub 418 may determine whether to transmit the communication signal based on the comparison result.

According to various embodiments, the display 412 (e.g., the display device 160) may display various graphical objects (e.g., GUI) associated with vehicle safety. In various embodiments, the display 412 may display the graphical object capable of activating whether to transmit and receive the communication signal for WAVE, and the AP 411 may transmit and receive the communication signal for WAVE according to an input from a user.

According to various embodiments, the audio module 413 (e.g., the audio module 170) may output vehicle-related warning sound or the like. The camera 414 (e.g., the camera module 180) may capture an image and the AP 411 may determine whether transmission and reception of the communication signal for WAVE are activated using the image received from the camera 414. According to various embodiments, the PMIC 415 (e.g., the power management module 188) may control at least one of a voltage and a current of power from the battery 417 (e.g., the battery 189) to be a numerical value suitable for each hardware, and may provide the resulting data. According to various embodiments, a cable for wired power transmission may be connected via the USB interface 416 (e.g., the interface 177), and the electronic device 401 may receive power via the USB interface 416 (e.g., the interface 177).

According to various embodiments, the display 421 may display various graphic objects (e.g., graphic user interface (GUI)) associated with vehicle safety. According to various embodiments, the AP 411 may display, on the display 412, a content indicating at least one of the movement and location of another vehicle, which is generated based on at least a portion of information included in the BSM received from the other vehicle. For example, the AP 411 may display, on the display device 412, contents corresponding to other vehicles, together with a navigation execution screen. The audio module 413 may output vehicle-related warning sound or the like. According to various embodiments, the AP 411 may display, on the display device 412, information (e.g., notification message) associated with a relay message received from another electronic device (e.g., external vehicle) in the form of, for example, text or an image, or may notify a driver of the information associated with the relay message in various methods (e.g., sound or warning sound) through the audio module 413.

According to various embodiments, when receiving the relay message from another external vehicle through the communication module 435, the AP 411 may control the designated function of the electronic device 401 (e.g., vehicle) based on the information associated with the received relay message. For example, the AP 411 of the electronic device 401 may perform vehicle control such as controlling a brake based on the received relay message, controlling the speed of the vehicle, or automatically blinking an emergency light.

According to various embodiments, the RFIC 433 may be implemented as a chipset for, for example, data communication, and may generate an electrical signal corresponding to a signal for data communication based on data provided from the AP 411 to provide the generated electrical signal to the antenna 434 for the RFIC. According to various embodiments, the acceleration sensor 419 may confirm the acceleration of the electronic device 401, the gyro sensor 420 may confirm rotation information thereof, and the geomagnetic sensor 421 may confirm geomagnetic information thereof.

According to various embodiments, the AP 411 or the sensor hub 418 may enable corresponding information to be included in the communication signal (e.g., communication signal including PSM or BSM) to be transmitted through the communication module 435 by using data from various sensors (e.g., the acceleration sensor 419, the gyro sensor 420, the geometric sensor 421, etc.) or the GPS module 431. In various embodiments, the electronic device 401 may not include the sensor hub 418. In this case, the AP 411 may be always in an automatic activation (wake-up) state or may be automatically activated (woken up) periodically to determine whether to transmit the communication signal.

In various embodiments, the AP 411 or the sensor hub 418 may execute a vulnerable road user (VRU) safety application. The VRU safety application may be an application capable of generating the above-described BSM or PSM. The VRU safety application may determine the location, direction, speed, and time of the electronic device 101, or the relative position of the electronic device 101 with other entities based on at least some of data from the GPS module 431, data acquired from a Bluetooth low energy (BLE) positioning system, and data collected from various sensors (e.g., the acceleration sensor 419, the gyro sensor 420, the geometric sensor 421, etc.). The VRU safety application may generate the PSM according to a detected event or may determine a point of time when the corresponding PSM is transmitted.

In various embodiments, the AP 411 or the sensor hub 418 may select any one of various states of the electronic device 401, and may accordingly determine a transmission or reception mode of the PSM or the BSM.

An electronic device according to any one of various embodiments may include at least one sensor; at least one communication circuit; and a processor electrically connected to the at least one sensor and/or the at least one communication circuit, wherein the processor may be configured to determine a relay message generation condition associated with a vehicle based at least on data acquired from the at least one sensor and/or the at least one communication circuit, generate a relay message based at least on the data acquired from the at least one sensor and/or the at least one communication circuit when the relay message generation condition is satisfied based on the determination result, and to transmit the generated relay message to an external vehicle through the at least one communication circuit.

According to various embodiments, the data acquired from the at least one sensor may include at least one of information about at least one external vehicle adjacent to the electronic device, information about an object loaded on the at least one external vehicle adjacent to the electronic device, information about a state of a road on which the electronic device is located, and information about weather in an area in which the electronic device is located.

According to various embodiments, the at least one sensor may include an image sensor included in a camera module, and the data acquired from the at least one sensor may include state information of a road determined from data collected through the image sensor.

According to various embodiments, the data acquired from the at least one communication circuit may include BSM data transmitted from the at least one external vehicle adjacent to the electronic device or PSM data transmitted from at least one external electronic device.

According to various embodiments, the relay message may include at least one of relay condition information about the relay message, message content information, and location information of the electronic device.

According to various embodiments, the relay condition information may include at least one of a relay frequency, a distance, a time, and a movement direction.

According to various embodiments, the relay message may be configured using a BSM of an SAE standard.

An electronic device according to any one of various embodiments may include at least one communication circuit; and a processor electrically connected to the at least one communication circuit, wherein the processor may be configured to determine whether a BSM is a relay message from information included in the BSM received through the at least one communication circuit, to determine whether a relay condition included in the BSM is satisfied when the BSM is the relay message, to generate the relay message based on the received BSM when the relay condition is satisfied, and to transmit the generated relay message to an external vehicle through the at least one communication circuit.

According to various embodiments, the electronic device may further include a display configured to be electrically connected to the processor, wherein the processor may be configured to display information associated with the received BSM through the display.

According to various embodiments, the processor may be configured to determine whether the relay condition included in the BSM is satisfied based at least on information associated with the electronic device, and to update relay-related information included in the received BSM to generate the relay message when the relay condition is satisfied.

According to various embodiments, the processor may be configured to display a notification message on the display, to output sound or warning sound, or to control a designated function of a vehicle, based on the relay-related information included in the received BSM.

According to various embodiments, the relay message transmitted to the external vehicle may be configured using a BSM of an SAE standard.

According to various embodiments, the relay condition may include at least one of a relay frequency, a distance, a time, and a movement direction.

According to various embodiments, the processor may be configured to transmit the generated relay message after a time randomly set by the electronic device.

Figure 5:
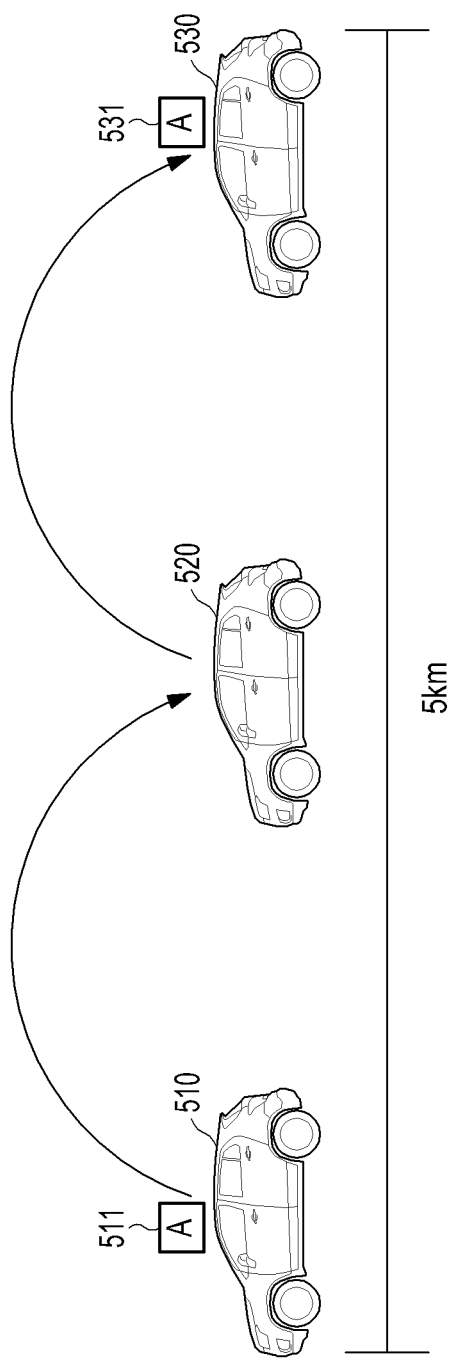
FIG. 5 is a diagram illustrating a transmission concept of a relay message according to various embodiments.

FIG. 5 is a diagram illustrating a transmission concept of a relay message according to various embodiments. Referring to FIG. 5, at least one vehicle 510 (referred to as a first vehicle for convenience of explanation) (e.g., the electronic devices 101, 102, and 104 of FIG. 1, the vehicles 220 and 240 of FIG. 2, and the electronic device 401 of FIG. 4) may determine a relay message generation condition associated with a vehicle based on data acquired from at least one sensor or at least one communication circuit.

According to various embodiments, when the relay message generation condition is satisfied based on the determination result, the first vehicle 510 may generate a relay message 511 based at least on the data acquired from the at least one sensor or the at least one communication circuit. The first vehicle 510 may transmit the generated relay message 511 to an external vehicle through the at least one communication circuit.

According to various embodiments, a second vehicle 520 that is an external vehicle of the first vehicle 510 may receive the relay message 511 transmitted from the first vehicle 510, and may display information (e.g., notification message) associated with the received relay message 511 on a display in the form of, for example, text or an image or may notify a driver of the information associated with the received relay message 511 in various methods (e.g., sound or warning sound).

According to various embodiments, the second vehicle 520 may receive the relay message 511 and may control a designated function of the second vehicle 520 based on the information associated with the received relay message 511. For example, the second vehicle 520 may perform vehicle control such as controlling a brake, controlling the speed thereof, or automatically blinking an emergency light based on the received relay message 511.

The second vehicle 520 may confirm a relay condition included in the received relay message, and may determine whether the confirmed relay condition is satisfied. According to various embodiments, when the relay condition is satisfied based on the determination result, the second vehicle 520 may retransmit the received relay message to at least one external vehicle. According to various embodiments, when the relay condition is satisfied based on the determination result, the second vehicle 520 may update relay-related information (e.g., relay condition information) of the received relay message, and may retransmit the updated relay message to the at least one external vehicle.

According to various embodiments, a third vehicle 530 may receive the relay message transmitted by the second vehicle 520. The third vehicle 530 may receive a relay message 531 transmitted from the second vehicle 520, and may display information associated with the received relay message 531 on the display or may notify a driver of the same in various methods (e.g., sound or warning sound).

According to various embodiments, the third vehicle 530 may receive the relay message 531 and may control a designated function of the third vehicle 530 based on the information associated with the received relay message 531. For example, the third vehicle 530 may perform vehicle control such as controlling a brake based on the received relay message 531, controlling the speed of a vehicle, or automatically blinking an emergency light.

According to various embodiments, a vehicle-related message may be transmitted even to a vehicle separated by a long distance of a predetermined distance (e.g., 1 km) or more by continuously transmitting the vehicle-related message from at least one vehicle to another external vehicle by the method illustrated in FIG. 5. For example, when a coverage capable of transmitting a BSM transmitted between vehicles is limited within a predetermined distance (e.g., 300 m to 1 km), a message may be transmitted to a vehicle beyond the transmission coverage of the BSM by relaying and transmitting the message as in the method illustrated in FIG. 5.

Figure 6:
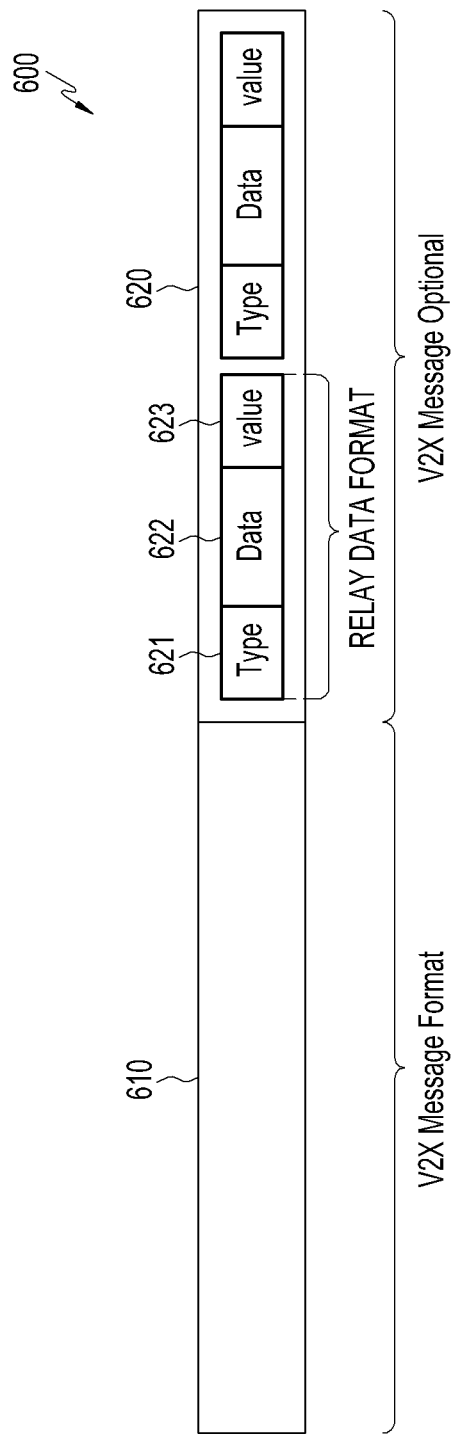
FIG. 6 is a diagram illustrating a data format of a relay message according to various embodiments.

FIG. 6 is a diagram illustrating a data format of a relay message according to various embodiments. Referring to FIG. 6, a relay message according to various embodiments may be included in a V2X message 600 and may be transmitted.

For example, when the V2X message 600 includes a V2X message format region 610 and a V2X message addition region 620 as illustrated in FIG. 6, at least one piece of relay data of the relay message may be included in the V2X message addition region 620 and may be transmitted.

According to various embodiments, the relay data may be configured to include data fields such as a type field 621, a data field 622, a value field 623, etc. For example, the type field 621 may include a life cycle value of the relay message and may determine whether the relay message is transmitted or deleted according to the life cycle. According to various embodiments, the type field 621 may include a message relay reference value such as a movement direction (up or down), a distance, a time, a relay frequency, or the like.

For example, the data field 622 may include information of the relay message (e.g., localization, real-time, and message-based processed values received from a plurality of vehicles). According to various embodiments, the data field 622 may include data corresponding to immediate/local information such as a dangerous area notification, a traffic accident warning, an emergency vehicle warning, etc., and may include data processed based on messages acquired from a plurality of pieces of vehicle information such as traffic jam, "single lane driving", warning for no passing, etc. For example, the value field 623 may include information such as a distance from a current vehicle from a reference to which the relay message is transmitted, a time, a calculated value of the relay frequency, etc.

Figure 7:
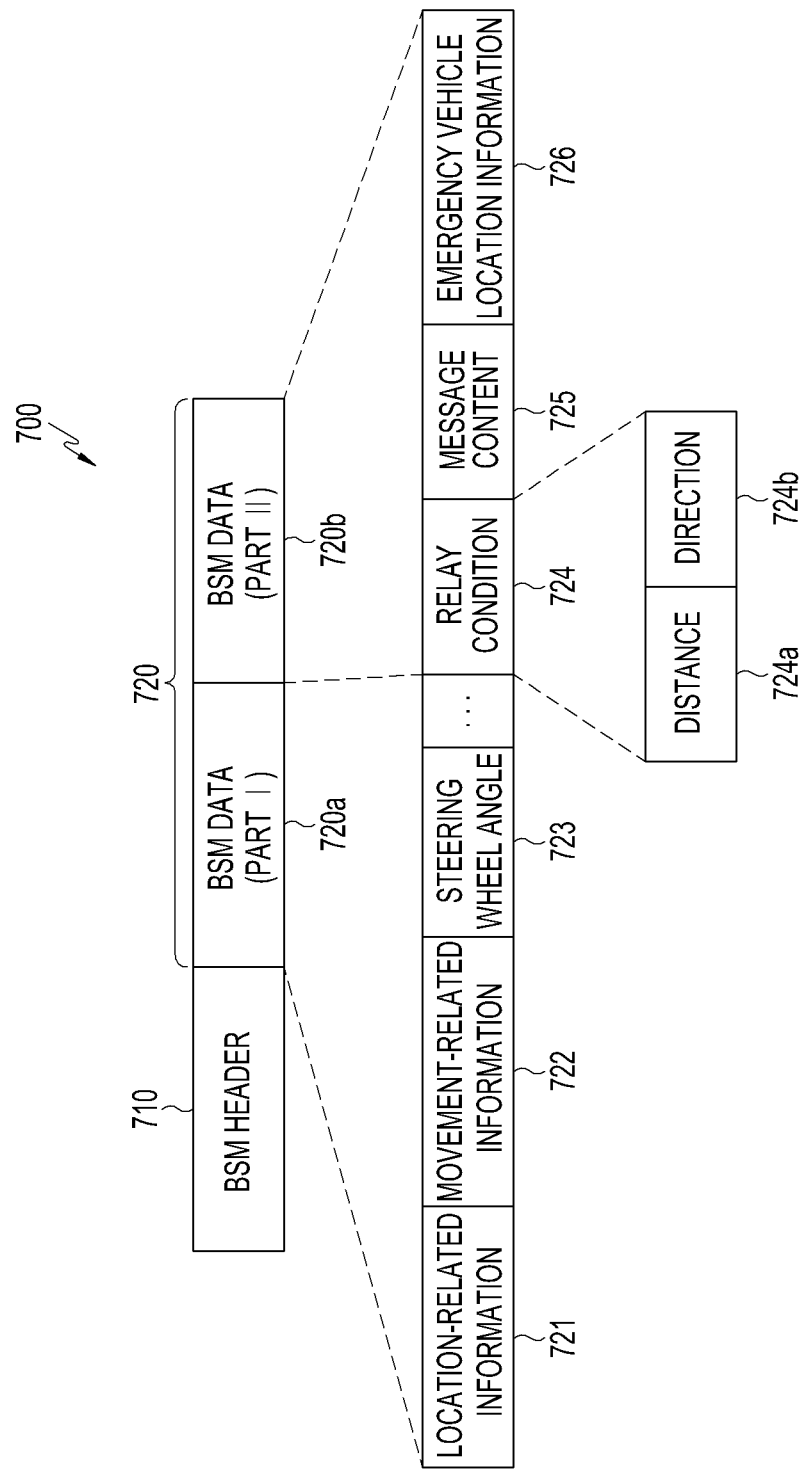
FIG. 7 is a diagram illustrating a data format of a relay message using a basic safety message (BSM) according to various embodiments.

FIG. 7 is a diagram illustrating a data format of a relay message using a BSM according to various embodiments. Referring to FIG. 7, a relay message according to various embodiments may enable relay-related information to be included in a BSM 700 and the resulting data may be transmitted. For example, the BSM 700 may be configured to include a BSM header 710 and a BSM data part 720 including a BSM data part 1 field 720a, and a BSM data part 2 field 720b.

The BSM 700 may configure a message set, a data frame, and a data element, which are associated with an application for implementing a WAVE scheme, in a form defined in a specific SAE standard (e.g., document J2735).

For example, the BSM data part 1 field 720a may include information 721 associated with the location of a vehicle (e.g., latitude, longitude, altitude, or location accuracy), information 722 associated with the movement of a vehicle (e.g., speed or heading), a steering wheel angle 723, acceleration setting, control information (e.g., brake status), or basic information of a basic transportation means (e.g., size of the transportation means).

According to various embodiments, the BSM data part 2 field 720b may include at least one piece of relay data or relay-related information constituting the relay message. For example, the BSM data part 2 field 720b may include at least one piece of data included in the V2X message addition region 620 of FIG. 6.

According to various embodiments, the BSM data part 2 field 720b may include a relay condition 724, a message content 725, and emergency vehicle location information 726 as illustrated in FIG. 7. The relay condition 724 may include distance information 724a or direction (e.g., up or down, or heading) information 724b. Specific examples of utilization of the above-mentioned data will be described in greater detail below with reference to FIGS. 10 to 15. The types of information included in the BSM 700 illustrated in FIG. 7 are examples and may be changed according to a change in the standard. The vehicle 220 according to various embodiments may transmit a communication signal including information having the same information type as the information type defined in the BSM 700, or may transmit the communication signal 233 including information having at least partially different information type from the information type defined in the BSM 700.

Figure 8:
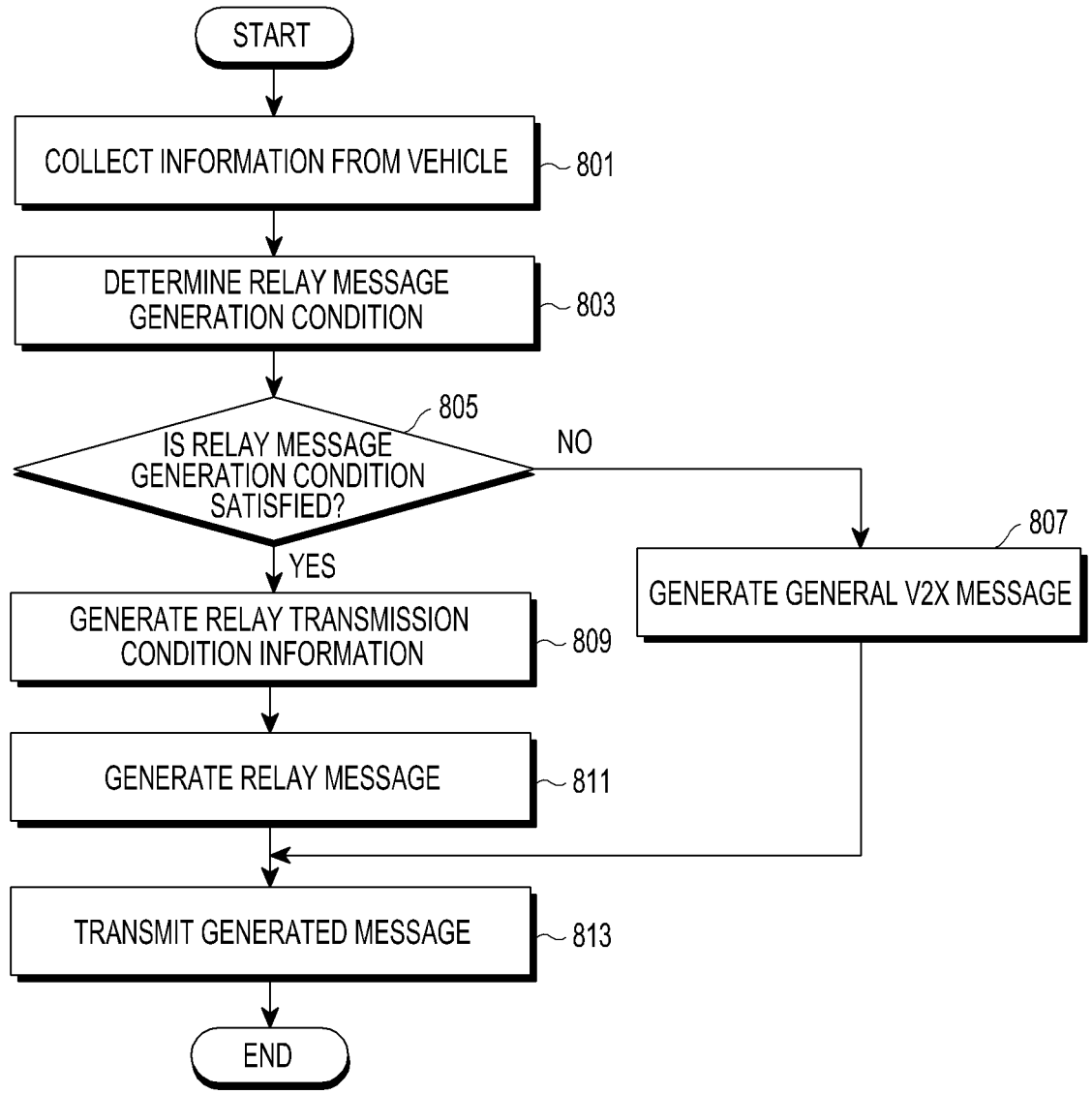
FIG. 8 is a flowchart illustrating a procedure for transmitting a relay message to an external vehicle according to various embodiments.

FIG. 8 is a flowchart illustrating a procedure for transmitting a relay message to an external vehicle according to various embodiments. Referring to FIG. 8, in operation 801, an electronic device (e.g., the electronic device 101, 102, or 104, the vehicle 220 or 240 of FIG. 2, or the electronic device 401 of FIG. 4) may collect information or data from at least one sensor or at least one communication circuit.

According to various embodiments, the information collected by the sensor of the electronic device may include at least one of information about at least one external moving means (e.g., vehicle) adjacent to the electronic device, information about an object loaded on the at least one external vehicle adjacent to the electronic device, information about the state of a road on which the electronic device is located, and information about weather in an area in which the electronic device is located. According to various embodiments, the at least one sensor may include an image sensor included in a camera module, and the data acquired from the at least one sensor may include state information of a road determined from data collected through the image sensor.

According to various embodiments, the data acquired from the communication circuit of the electronic device may include BSM data transmitted from the at least one external vehicle adjacent to the electronic device or PSM data transmitted from at least one external electronic device.

In operation 803, the electronic device may determine a relay message generation condition associated with a vehicle based at least on information or data acquired from the at least one sensor or the at least one communication circuit. For example, neighboring vehicles, a road condition, and weather condition information may be determined through the information acquired from the sensor of the electronic device, and a plurality of V2X messages received from a plurality of neighboring vehicles or terminals through the communication circuit of the electronic device may be analyzed to determine whether the plurality of V2X messages match data corresponding to the relay message generation condition.

When the relay message generation condition is satisfied based on the determination result in operation 805, the electronic device may generate relay message-related information based at least on the data acquired from the at least one sensor or the at least one communication circuit in operation 809. According to various embodiments, the relay message-related information may correspond to data included in the relay data format field 620 or the BSM data part 2 field 720b illustrated in FIG. 6 or 7.

In operation 811, the electronic device may generate a relay message based on the generated relay message-related information. According to various embodiments, the relay message may be composed of the V2X message illustrated in FIG. 6 or 7 or the BSM.

In operation 813, the electronic device may transmit the generated relay message to at least one external vehicle through the communication circuit.

According to various embodiments, when the relay message generation condition is not satisfied based on the determination result in operation 805, the electronic device may generate a general V2X message or BSM based at least on the data acquired from the at least one sensor or the at least communication circuit and may transmit the generated information in operation 807.

Figure 9:
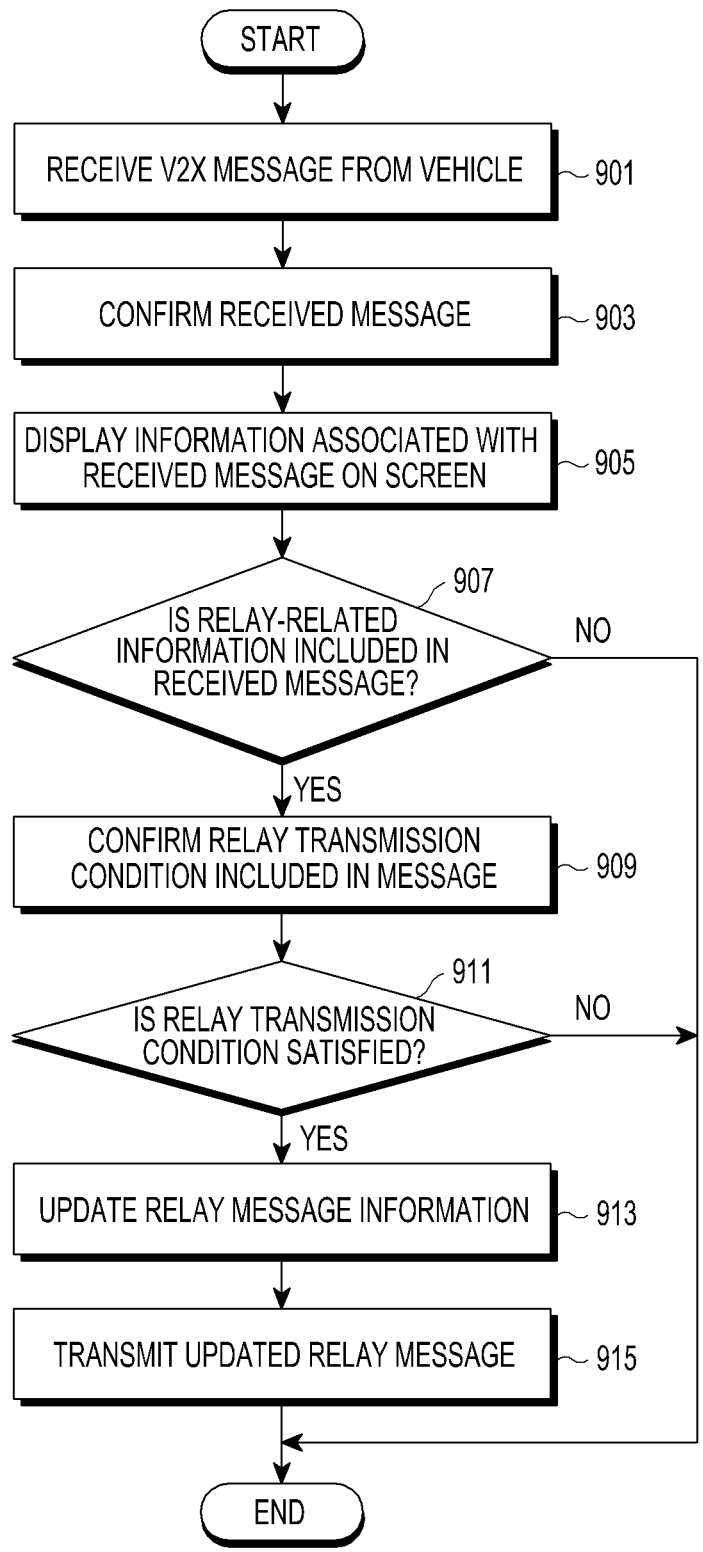
FIG. 9 is a flowchart illustrating a procedure for retransmitting a received relay message according to various embodiments.

FIG. 9 is a flowchart illustrating a procedure for retransmitting a received relay message according to various embodiments. Referring to FIG. 9, in operation 901, an electronic device (e.g., the electronic device 101, 102, or 104, the vehicle 220 or 240 of FIG. 2, or the electronic device 401 of FIG. 4) (e.g., a vehicle) may receive a V2X message or a BSM transmitted from an external vehicle, and may confirm the received message in operation 903.

In operation 905, the electronic device may display information associated with the received V2X message or BSM on a screen through a display, or may notify a driver of the same in various methods (e.g., sound or warning sound). According to various embodiments, the electronic device may receive the relay message, and may control a designated function of the electronic device based on information associated with the received relay message. For example, the electronic device may perform vehicle control such as controlling a brake based on the received relay message, controlling the speed of the vehicle, or automatically blinking an emergency light.

In operation 907, the electronic device may determine whether relay-related information is included in the received V2X message or BSM, and may determine whether the received message is a relay message. For example, when designated relay-related information is included in various types of messages received at the electronic device, the received message may be determined to be the relay message. According to various embodiments, when the message is the relay message, the relay message may include a data field of at least one of relay condition information, message content information, and location information of the electronic device.

When the received message is the relay message based on the determination result, the electronic device may confirm a relay transmission condition (or a relay condition) included in the received message in operation 909. According to various embodiments, the relay condition information may include at least one of a relay frequency, a distance, a time, and a movement direction.

When the relay condition is satisfied based on the determination result in operation 911, the electronic device may update the relay message information in operation 913. For example, the electronic device may update the relay frequency or life cycle information included in the relay message.

In operation 915, the electronic device may retransmit the updated relay message to at least one external vehicle through the communication circuit.

According to various embodiments, a vehicle-related message may be transmitted even to a vehicle separated by a long distance of a predetermined distance (e.g., 1 km) or more by continuously transmitting the vehicle-related message from at least one vehicle to another external vehicle by the above-described method. For example, when a coverage capable of transmitting a BSM transmitted between vehicles is limited within a predetermined distance (e.g., 300 m to 1 km), a message may be transmitted to a vehicle beyond the transmission coverage of the BSM by relaying and transmitting the message as in the above-described method.

A method of transmitting a relay message from an electronic device to an external vehicle according to any one of various embodiments may include determining a relay message generation condition associated with a vehicle based at least on data acquired from at least one sensor or at least one communication circuit; generating a relay message based at least on the data acquired from the at least one sensor or the at least one communication circuit when the relay message generation condition is satisfied based on the determination result; and transmitting the generated relay message to the external vehicle through the at least one communication circuit.

According to various embodiments, the data acquired from the at least one sensor may include at least one of information about at least one external vehicle adjacent to the electronic device, information about an object loaded on the at least one external vehicle adjacent to the electronic device, information about a state of a road on which the electronic device is located, and information about weather in an area in which the electronic device is located.

According to various embodiments, the data acquired from the at least one sensor may include state information of a road determined from data collected through an image sensor included in a camera module.

According to various embodiments, the data acquired from the at least one communication circuit may include BSM data transmitted from the at least one external vehicle adjacent to the electronic device or PSM data transmitted from at least one external electronic device.

According to various embodiments, the relay message may include at least one of relay condition information about the relay message, message content information, and location information of the electronic device.

According to various embodiments, the relay condition information may include at least one of a relay frequency, a distance, a time, and a movement direction.

According to various embodiments, the relay message may be configured using a BSM of an SAE standard.

Hereinafter, examples of various situations of transmitting a relay message to an external vehicle according to an embodiment will be described in greater detail with reference to FIGS. 10 to 15.

Figure 10:
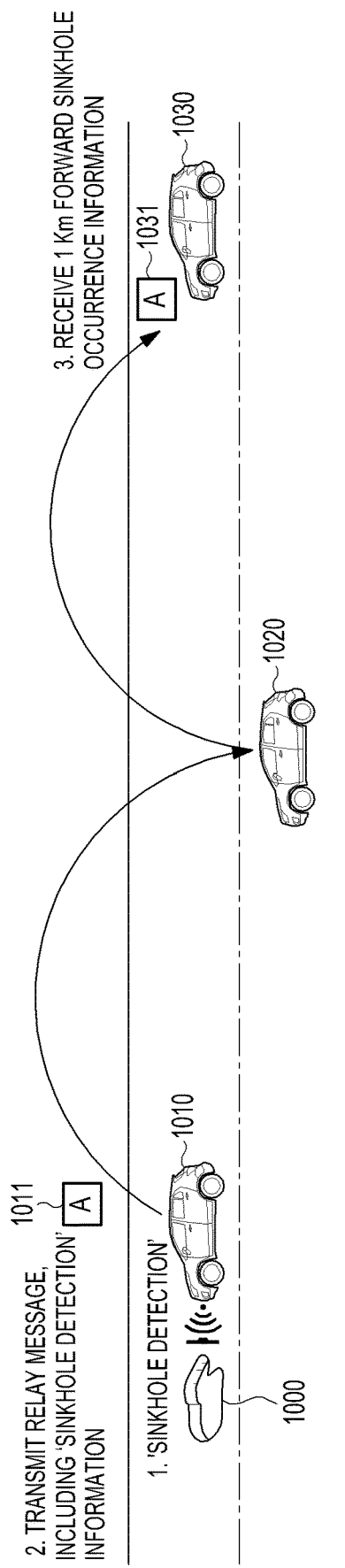
FIG. 10 is a diagram illustrating an example of a situation where a relay message is transmitted to an external vehicle according to various embodiments.

FIG. 10 is a diagram illustrating an example of a situation where a relay message is transmitted to an external vehicle according to various embodiments. Referring to FIG. 10, a first vehicle 1010 may detect a sinkhole 1000 through at least one sensor (e.g., an image sensor provided in a camera module (e.g., the camera module 180 of FIG. 1) while traveling on a road.

The first vehicle 1010 may determine that the detected sinkhole 1000 is a dangerous situation and may determine whether the detection of the sinkhole 1000 satisfies a predetermined relay message generation condition (or a relay message transmission condition).

When the detection of the sinkhole 1000 satisfies the predetermined relay message generation condition based on the determination result, the first vehicle 1010 may generate a relay message 1011 including related information according to the detection of the sinkhole 1000. The first vehicle 1010 may transmit the generated relay message 1011 to an external vehicle.

A second vehicle 1020 may receive the relay message transmitted by the first vehicle 1010. The second vehicle 1020 may display information associated with the received relay message on a screen through a display. According to various embodiments, the second vehicle 1020 may receive the relay message 1011 and may control a designated function of the second vehicle 1020 based on the information associated with the received relay message 1011. For example, the second vehicle 1020 may perform vehicle control such as controlling a brake based on the received relay message 1011, controlling the speed of the vehicle, or automatically blinking an emergency light.

The second vehicle 1020 may confirm a relay transmission condition included in the received relay message, and may generate a relay message based on the received relay message to retransmit the generated relay message to at least one external vehicle when the relay transmission condition is satisfied. A third vehicle 1030 may confirm the relay message 1031 retransmitted by the second vehicle 1020 and may confirm information indicating that the sinkhole is detected, for example, 1 km ahead.

Although FIG. 10 illustrates the detection of the sinkhole, real-time vehicle status information such as obstacle detection, overloading, falling object occurrence concern vehicle information, emergency vehicle access notification, or vehicle failure notification, real-time road information such as construction section, real-time weather information such as fog, a sea fog, yellow sand, or heavy rain, and the like may be generated as the relay message and transmitted.

Figure 11:
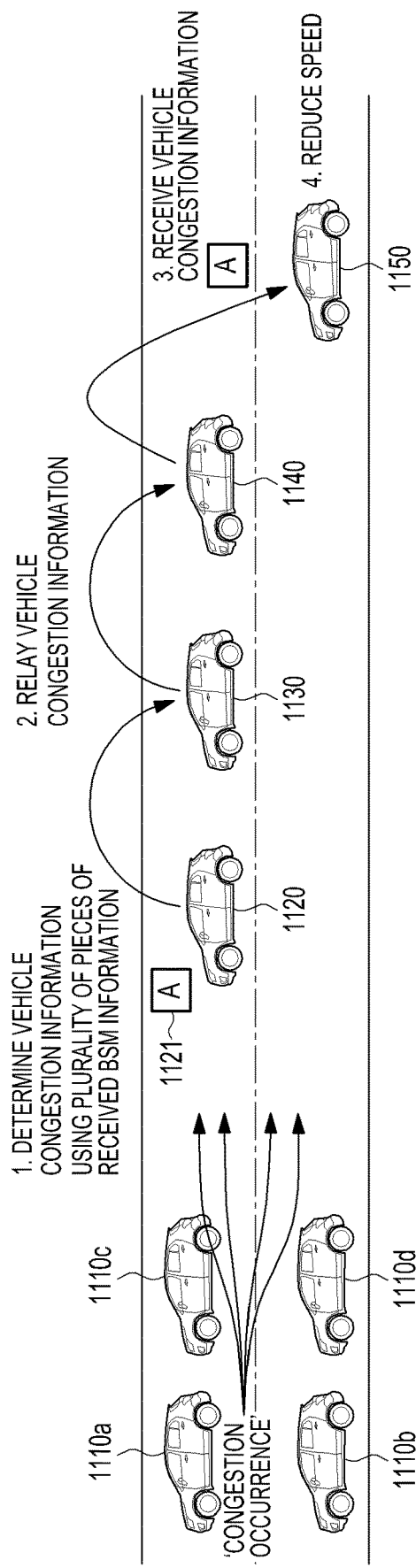
FIG. 11 is a diagram illustrating an example of a situation where a relay message is transmitted to an external vehicle according to various embodiments.

FIG. 11 is a diagram illustrating an example of a situation where a relay message is transmitted to an external vehicle according to various embodiments. Referring to FIG. 11, a first vehicle 1120 may receive a BSM through a communication circuit from a plurality of vehicles 1110a, 1110b, 1110c, and 1110d, which are traveling ahead of the first vehicle 1120, while the first vehicle 1120 is traveling on a road. The first vehicle 1120 may determine vehicle congestion information from information included in the BSM.

The first vehicle 1120 may determine whether the vehicle congestion information included in the BSM satisfies a predetermined relay message generation condition (or a relay message transmission condition).

When the vehicle congestion information satisfies the predetermined relay message generation condition based on the determination result, the first vehicle 1120 may generate a relay message 1121, including the vehicle congestion information. The first vehicle 1120 may transmit the generated relay message 1121 to an external vehicle.

The relay message 1121 transmitted by the first vehicle 1120 may be continuously relayed and transmitted to a second vehicle 1130, a third vehicle 1140, and a fourth vehicle 1150.

According to various embodiments, even though a transmittable coverage of the BSM is small, a vehicle (e.g., the fourth vehicle 1150) located at a remote location may also confirm various types of information (e.g., vehicle congestion information) by continuously relaying and transmitting the BSM as described above.

In FIG. 11, an example in which the vehicle congestion information is relayed and transmitted has been described. However, information such as a traffic accident situation such as multiple collision accident or road collapse notification, "single lane driving" information, a real-time traffic information status such as specific road congestion, and the like may be generated as the relay message and transmitted.

Figure 12:
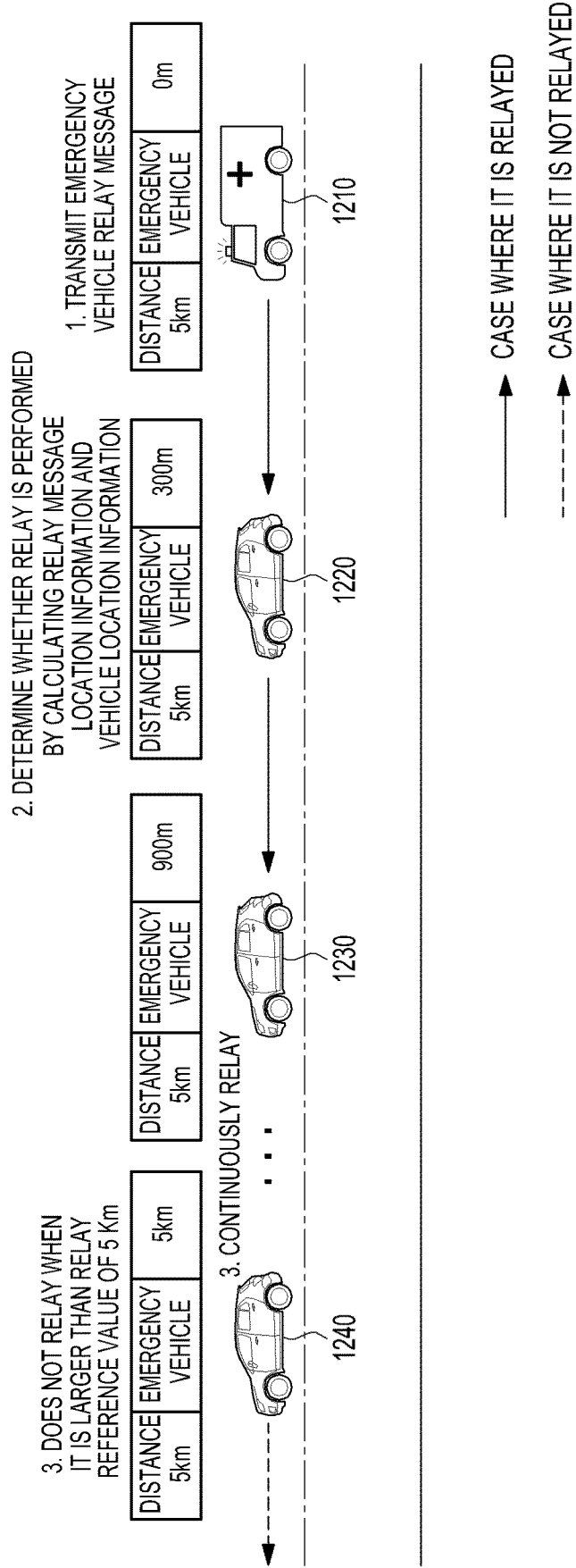
FIG. 12 is a diagram illustrating an example of a situation where a relay message is transmitted to an external vehicle according to various embodiments.

FIG. 12 is a diagram illustrating an example of a situation where a relay message is transmitted to an external vehicle according to various embodiments. Referring to FIG. 12, according to various embodiments, a first vehicle 1210 (e.g., an ambulance) may transmit a relay message to a plurality of vehicles 1220, 1230 and 1240, which are traveling ahead of the first vehicle 1210, while the first vehicle 1210 is traveling on a road, using the above-described method.

For example, in order to notify that the first vehicle 1210 is an emergency vehicle, the first vehicle 1210 may configure and transmit a relay message to include relay data of which life cycle may be set as 5 km and content is 'emergency vehicle'. According to various embodiments, the relay data may further include a current location (e.g., location measured by a GPS) of the first vehicle 1210. According to various embodiments, the relay message may include a V2X or a BSM.

The relay message transmitted by the first vehicle 1210 may be transmitted to the second vehicle 1220, and the second vehicle 1220 may confirm the message received from the first vehicle 1210 and determine whether a relay condition is satisfied. For example, the second vehicle 1220 may calculate a relative distance from location information of the first vehicle 1210 and location information of the second vehicle 1220, and may determine whether the calculated distance satisfies within the relay condition (or relay transmission condition) (e.g., 5 km).

For example, since a distance between the second vehicle 1220 and the first vehicle 1210 is 300 m and is within the relay condition of 5 km, the received message may be retransmitted.

In the same manner as described above, the relay message may be relayed and transmitted to the third vehicle 1230 and the fourth vehicle 1240 via the second vehicle 1220.

According to various embodiments, the fourth vehicle 1240 may calculate a relative distance from the location information of the first vehicle 1210 and location information of the fourth vehicle 1240, and whether the calculated distance satisfies within the relay condition (or relay transmission condition) (e.g., 5 km) may be determined. For example, when a distance between the fourth vehicle 1240 and the first vehicle 1210 exceeds the relay condition of 5 km, the received relay message may not be retransmitted due to life time extinction.

According to various embodiments, as illustrated in FIG. 12, the BSM may be immediately transmitted by including locality-based information such as accident occurrence, emergency vehicle dispatch, weather information, sinkholes, and the like in the relay data. As described above, whether each piece of relay data is retransmitted may be determined by a life time defined according to the types, and therefore each piece of relay data may be destroyed when the life time expires.

Figure 13:
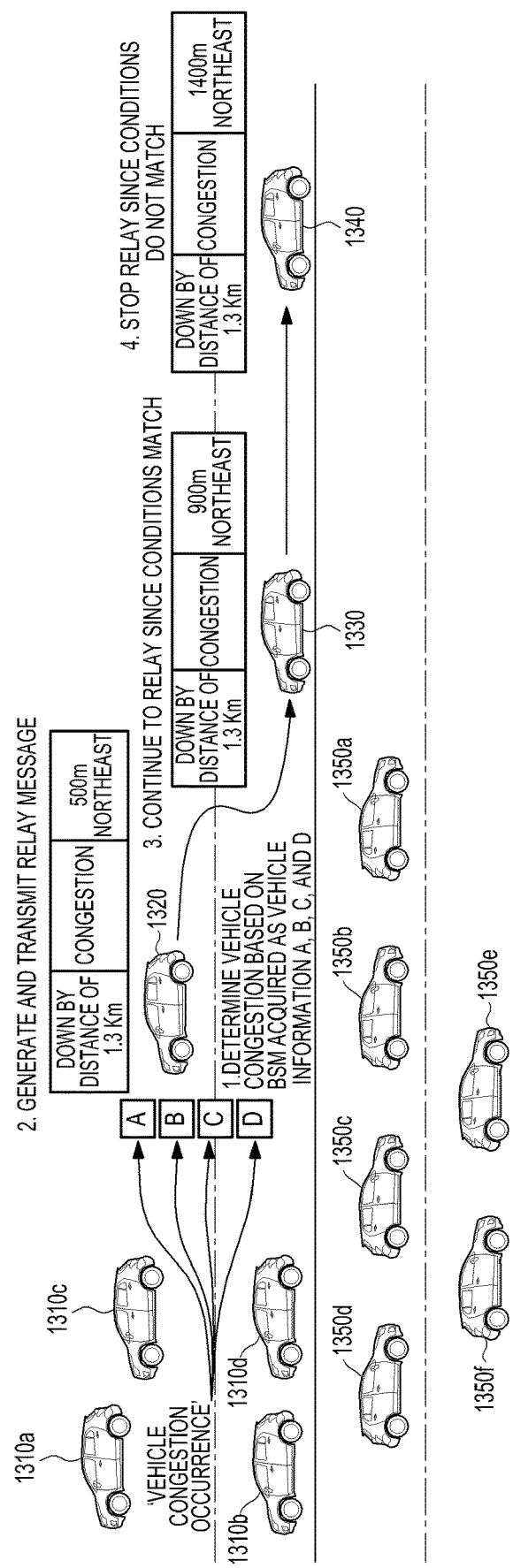
FIG. 13 is a diagram illustrating an example of a situation where a relay message is transmitted to an external vehicle according to various embodiments.

FIG. 13 is a diagram illustrating an example of a situation where a relay message is transmitted to an external vehicle according to various embodiments. Referring to FIG. 13, according to various embodiments, when vehicle congestion information is determined based on a plurality of BSMs received from a plurality of pieces of vehicle information, a relay message may be transmitted by including a reference setting value for a direction and a distance and data information in relay data. For example, each vehicle may calculate its own vehicle direction/distance and may transmit the received relay message (e.g., BSM) only when a corresponding condition is satisfied.

According to various embodiments, a first vehicle 1320 may receive the BSM from a plurality of vehicles 1310a, 1310b, 1310c, and 1310d, which are traveling ahead of the first vehicle 1320, through a communication circuit while the first vehicle 1320 is traveling on a road. The first vehicle 1320 may determine vehicle congestion information from information included in the BSM.

The first vehicle 1320 may determine whether the vehicle congestion information included in the BSM satisfies a predetermined relay message generation condition (or a relay message transmission condition).

When the vehicle congestion information satisfies the relay message generation condition based on the determination result, the first vehicle 1320 may generate a relay message, including the vehicle congestion information. The first vehicle 1320 may transmit the generated relay message to an external vehicle. According to various embodiments, the relay message may further include distance and direction (e.g., up or down) information (e.g., "down by a distance of 1.3 km"), relay message content (e.g., congestion), and a value field (500 m northeast) as a relay condition.

The relay message transmitted by the first vehicle 1320 may be continuously relayed and transmitted to the second vehicle 1330 and the third vehicle 1340 which are traveling in the same direction (e.g., down direction) as that of the first vehicle 1320. According to various embodiments, the second vehicle 1330 may receive the relay message from the first vehicle 1320, may confirm relay condition information included in the relay message, and may retransmit the received relay message because the relay transmission condition is satisfied. According to various embodiments, the second vehicle 1330 may update and retransmit relay-related information included in the relay message received from the first vehicle 1320, when the relay message is retransmitted.

According to various embodiments, the third vehicle 1340 may receive the relay message from the second vehicle 1330, may confirm the relay condition information included in the relay message, and may stop the retransmission of the received relay message when the relay transmission condition is not satisfied. According to various embodiments, the relay message transmitted by the first vehicle 1320 may be also transmitted to at least one vehicle 1350a, 1350b, 1350c, 1350d, 1350e, 1350f which is traveling in a direction (e.g., up direction) opposite the direction of the first vehicle 1320. The at least one vehicle 1350a to 1350f which is traveling in the direction (e.g., up direction) opposite the direction of the first vehicle 1320 may confirm direction information included in the received relay message, and may determine that the relay condition is not satisfied because the at least one vehicle 1350a to 1350f is traveling in the direction opposite the direction of the first vehicle 1320. Based on the determination result, the at least one vehicle 1350a to 1350f which is traveling in the direction (e.g., up direction) opposite the direction of the first vehicle 1320 may not retransmit the received relay message. According to various embodiments, the at least one vehicle 1350a to 1350f which is traveling in the direction (e.g., up direction) opposite the direction of the first vehicle 1320 may control to display or not to display information associated with the received relay message through a display or the like.

Figure 14:
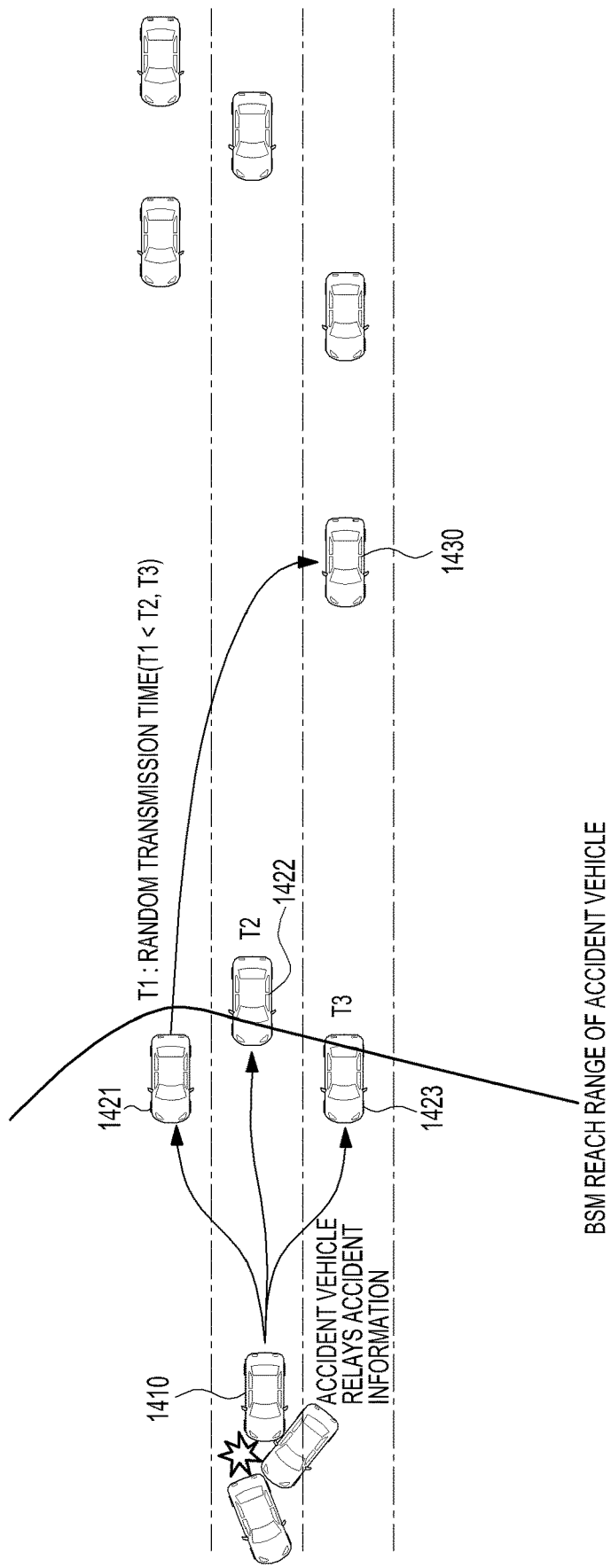
FIG. 14 is a diagram illustrating an example of a situation where a relay message is transmitted to an external vehicle according to various embodiments.

FIG. 14 is a diagram illustrating an example of a situation where a relay message is transmitted to an external vehicle according to various embodiments. Referring to FIG. 14, when an accident occurs while the first vehicle 1410 is traveling on a road, an accident state may be determined through at least one sensor. The first vehicle 1410 may determine that the determined accident state is a dangerous situation and may determine whether the relay message generation condition (or relay message transmission condition) is satisfied.

When the relay message generation condition is satisfied based on the determination result, the first vehicle 1410 may generate a relay message, including the accident-related information. The first vehicle 1410 may transmit the generated relay message to an external vehicle.

As illustrated in FIG. 14, a plurality of vehicles 1421, 1422, and 1423 located within a BSM reach range of an accident vehicle may simultaneously receive the relay message transmitted by the first vehicle 1410.

When the plurality of vehicles (the second vehicle 1421, the third vehicle 1422, and the fourth vehicle 1423) simultaneously receive the relay message and simultaneously retransmit the received relay message, the number of messages to be transmitted may be increased so that a case in which congestion of a wireless channel is unnecessarily increased may occur.

According to various embodiments, in order to solve this problem, a message may be relayed and transmitted by applying a retransmission method using a random transmission time or a BSM coverage-based retransmission method.

According to the retransmission method using the random transmission time, vehicles having received the relay message having a specific signal strength or less may respectively set the random transmission time to wait for transmission. When a vehicle with the highest random transmission time transmits the corresponding message, other vehicles may stop message transmission.

For example, as illustrated in FIG. 14, the plurality of vehicles 1421, 1422, and 1423 located within the BSM reach range of the accident vehicle may simultaneously receive the relay message received by the first vehicle 1410, and each of the plurality of vehicles may randomly set a transmission time for message retransmission. Assuming that the transmission time of the second vehicle 1421 among the plurality of vehicles is the fastest, when the second vehicle 1421 retransmits the relay message, the third vehicle 1422 and the fourth vehicle 1423 located in the vicinity of the second vehicle 1421 may receive the corresponding relay message. The third vehicle 1422 and the fourth vehicle 1423 located in the vicinity of the second vehicle 1421 may detect that the received relay message has already been retransmitted by another neighboring vehicle (second vehicle 1421) to stop the message retransmission desired to be performed, and thereby only the second vehicle 1421 may retransmit the relay message. A fifth vehicle 1430 may receive the relay message transmitted by the second vehicle 1421.

According to various embodiments, according to the BSM coverage-based retransmission method, a vehicle (e.g., the third vehicle 1422 in FIG. 14) located farthest within the BSM reach range may retransmit the relay message.

Figure 15:
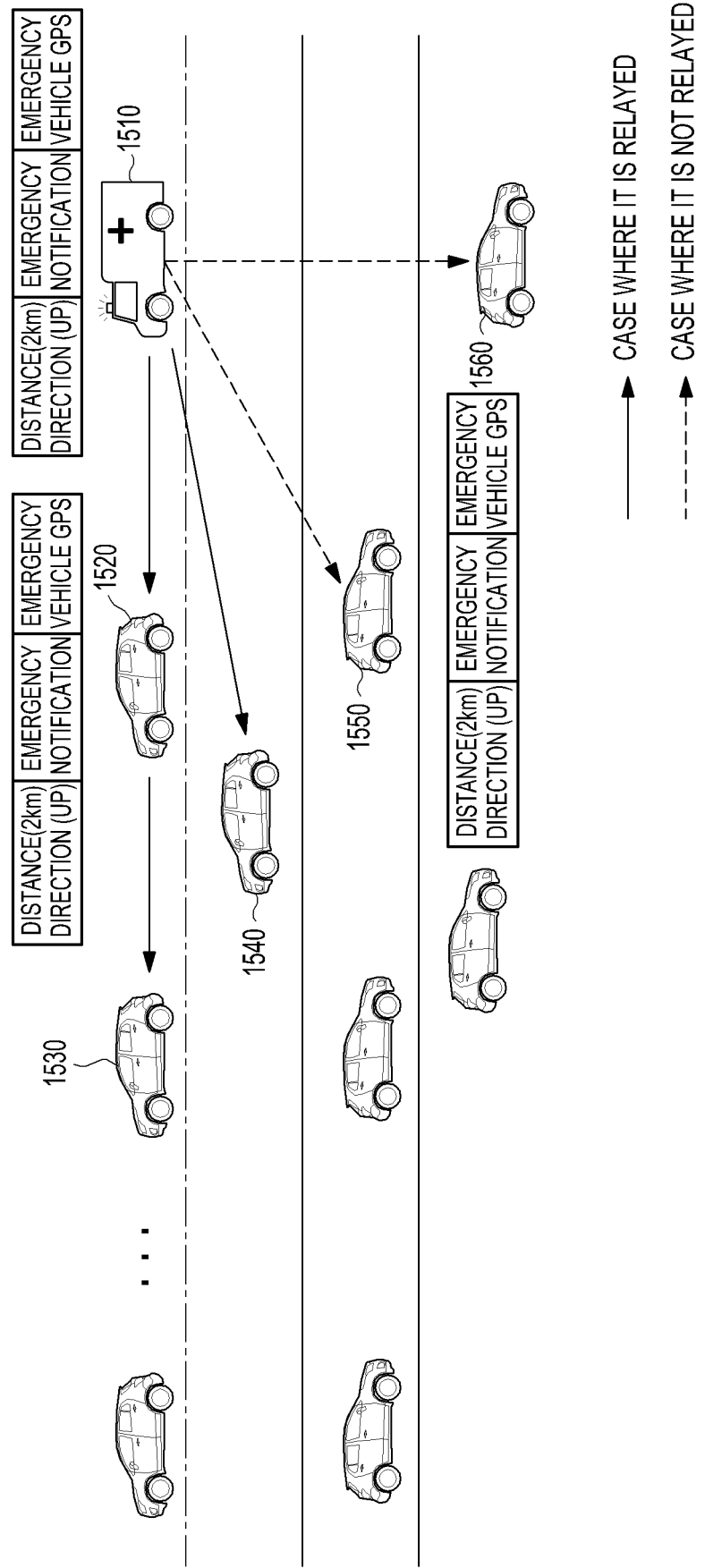
FIG. 15 is a diagram illustrating an example of a situation where a relay message is transmitted to an external vehicle according to various embodiments.

FIG. 15 is a diagram illustrating an example of a situation where a relay message is transmitted to an external vehicle according to various embodiments. Referring to FIG. 15, according to various embodiments, a first vehicle 1510 (e.g., an ambulance) may transmit a relay message to a plurality of vehicles 1520, 1530, and 1540, which are traveling ahead of the first vehicle 1510, using the above-described method while the first vehicle 1510 is traveling on a road.

For example, in order to notify that the first vehicle 1510 is an emergency vehicle, the first vehicle 1510 may configure and transmit the relay message to include relay data of which relay condition is set as a distance of 2 km, direction is set as an up direction, and content is set as 'emergency notification'. According to various embodiments, the relay data may further include a current location (e.g., location measured by a GPS) (emergency vehicle GPS) of the first vehicle 1510. According to various embodiments, the relay message may include a V2X or a BSM.

The relay message transmitted by the first vehicle 1510 may be transmitted to the second vehicle 1520, the third vehicle 1530, and the fourth vehicle 1540, and the second vehicle 1520 may confirm a message received from the first vehicle 1510 and determine whether a relay condition is satisfied. For example, the second vehicle 1520 may calculate a relative distance from location information of the first vehicle 1510 and location information of the second vehicle 1520, and may determine whether the calculated distance satisfies within the relay condition (or relay transmission condition) (e.g., 2 km). In addition, whether a traveling direction of the second vehicle 1520 is an up direction according to the relay condition may be further determined.

For example, since a distance between the second vehicle 1520 and the first vehicle 1510 is within the relay condition of 2 km and the traveling direction is the up direction, the received message may be retransmitted.

In the same manner as described above, the relay message may be relayed and transmitted to the third vehicle 1530 via the second vehicle 1520.

According to various embodiments, a fifth vehicle 1550 and a sixth vehicle 1560 may calculate a relative distance from the location information of the first vehicle 1510 and location information of vehicles 1550 and 1560, and may determine whether the calculated distance satisfies within the relay condition (or relay transmission condition) (e.g., 2 km). For example, the distance between the fifth vehicle 1550 or the sixth vehicle 1560 and the first vehicle 1510 is within the relay condition of 2 km, but the condition for the traveling direction is not satisfied as shown in FIG. 15, and thereby the relay message may not be retransmitted.

Figure 16:
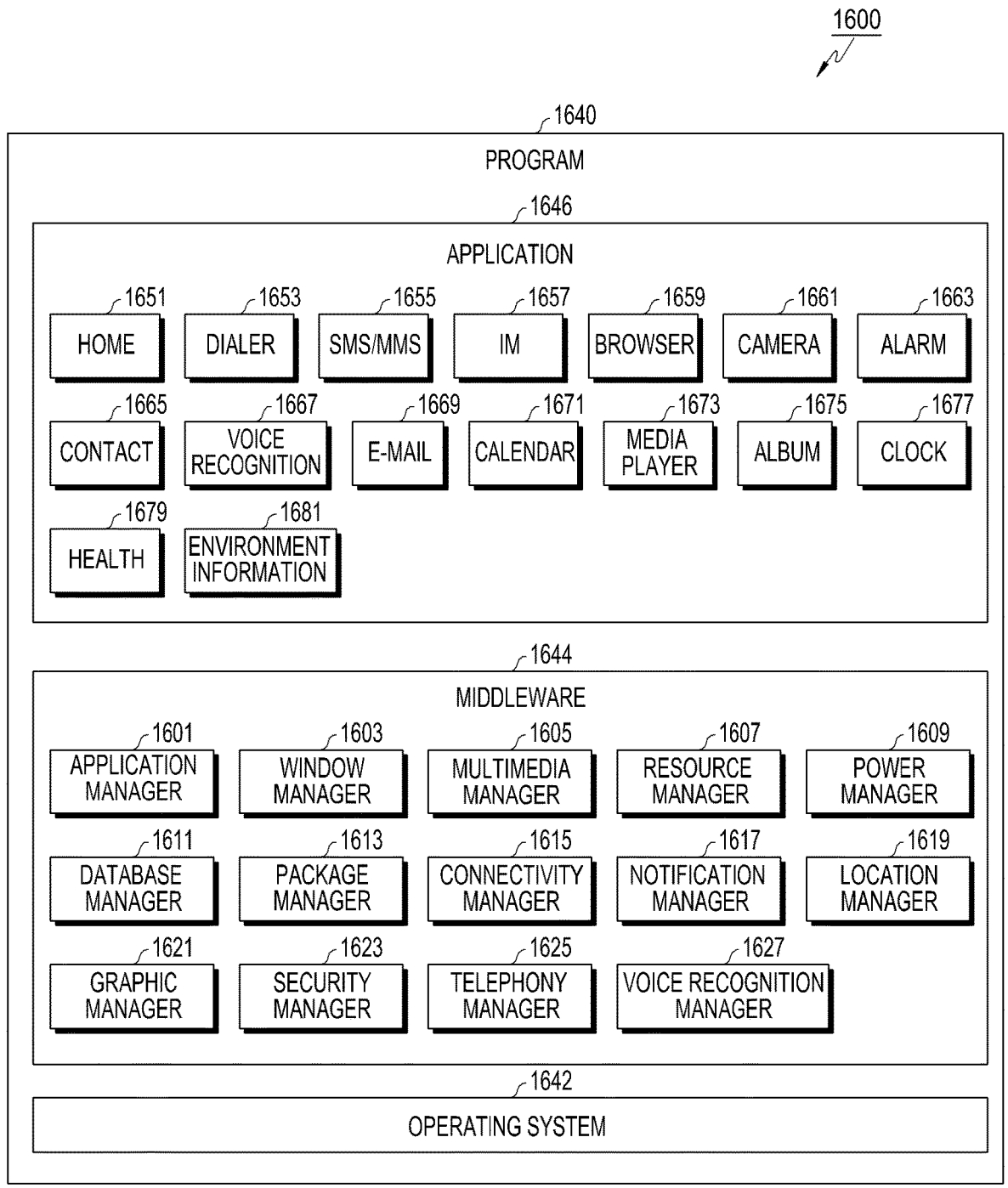
FIG. 16 is a block diagram illustrating a program module of an electronic device according to various embodiments.

FIG. 16 is a block diagram 1600 illustrating a program 1640 according to various embodiments. According to an embodiment, the program 1640 may include an operating system (OS) 1642 for controlling one or more resources of the electronic device 101, middleware 1644, and/or an application 1646 that can be executed on the OS 1642. The OS 1642 may include, for example, Android™, iOS™, Windows™, Symbian™, Tizen™, or Bada™. At least some of the programs 1640 may be preloaded to the electronic device 101 at the time of manufacture, or may be downloaded or updated from an external electronic device (e.g., the electronic device 102 or 104, or the server 108) in a use environment of a user.

The OS 1642 may control (e.g., allocate or recover) system resources (e.g., processes, memory, or power) of the electronic device 101. The OS 1642 may additionally or alternatively include other hardware devices of the electronic device 101, for example, one or more driver programs for driving an input device 150, an audio output device 155, a display device 160, an audio module 170, a sensor module 176, an interface 177, a haptic module 179, a camera module 180, a power management module 188, a battery 189, a communication module 190, a subscriber identification module 196, or an antenna module 197.

The middleware 1644 may provide various functions to the application 1646 so that the application 1646 can use functions or information provided by the one or more resources of the electronic device 101. The middleware 1644 may include, for example, an application manager 1601, a window manager 1603, a multimedia manager 1605, a resource manager 1607, a power manager 1609, a database manager 1611, a package manager 1613, a connectivity manager 1615, a notification manager 1617, a location manager 1619, a graphic manager 1621, a security manager 1623, a telephony manager 1625, and/or a voice recognition manager 1627. The application manager 1601 may manage, for example, the life cycle of the application 1646. The window manager 1603 may manage, for example, GUI resources used in a screen. The multimedia manager 1605 may identify a format required for reproduction of media files and may encode or decode a media file using a codec suitable for the format. The resource manager 1607 may manage, for example, a source code of the application 1646 or a space of the memory. The power manager 1609 may manage, for example, the capacity, temperature, or power of the battery and may determine or provide power information necessary for the operation of the electronic device 101 by using the information. According to an embodiment, the power manager 1609 may be interlocked with a basic input/output system (BIOS).

The database manager 1611 may create, retrieve, or change a database to be used in the application 1646. The package manager 1613 may manage installation or update of an application distributed in the form of a package file. The connectivity manager 1615 may manage a wireless or wired connection between the electronic device 101 and an external electronic device. The notification manager 1617 may provide a function for notifying a user of an event (e.g., a call, a message, or an alarm) that has occurred. The location manager 1619 may manage location information of the electronic device 101. The graphical manager 1621 may manage, for example, graphical effects to be provided to a user or a user interface associated therewith. The security manager 1623 may provide, for example, system security or user authentication. The telephony manager 1625 may manage, for example, a voice or video call function of the electronic device 101. The voice recognition manager 1627 may transmit, for example, voice data of a user to the server 108 and may receive character data converted based on a command or corresponding voice data corresponding to a function to be performed in the electronic device 101. According to an embodiment, the middleware 1644 may dynamically delete some existing components or add new components. According to an embodiment, at least a portion of the middleware 1644 may be included as a portion of the OS 1642, or may be implemented in software separate from the OS 1642.

The application 1646 may include, for example, a home application 1651, a dialer application 1653, an SMS/MMS application 1655, an instant message (IM) application 1657, a browser application 1659, a camera application 1661, an alarm application 1663, a contact application 1665, a voice recognition application 1667, an email application 1669, a calendar application 1671, a media player application 1673, an album application 1675, a clock application 1677, a health application 1679 (e.g., measuring exercise or blood glucose), and/or an environmental information application 1681 (e.g., air pressure, humidity, or temperature information). According to an embodiment, the application 1646 may further include an information exchange application (not shown) that can support exchange of information between the electronic device 101 and an external electronic device. The information exchange application may include, for example, a notification relay application for transmitting designated information (e.g., calls, messages, or alarms) to an external electronic device, or a device management application for managing an external electronic device. The notification relay application may transmit notification information corresponding to an event (e.g., mail reception) generated in another application (e.g., an email application 1669) of the electronic device 101 to an external electronic device, or may receive the notification information from the external electronic device to provide the received information to a user of the electronic device 101. The device management application may control an external electronic device communicating with the electronic device 101 or some components thereof (e.g., power (e.g., turn-on or turn-off) or function (e.g., brightness, resolution, or focus) of the display device 160 or the camera module 180) of the display device 160 or the camera module 180). The device management application may additionally or alternatively support the installation, deletion, or update of an application operated on an external electronic device.

The electronic device according to the various embodiments disclosed herein may be various types of devices. The electronic device may include, for example, and without limitation, at least one of a portable communication device (e.g., a smart phone), a computer device, a portable multimedia device, a portable medical device, a camera, a wearable device, and/or a home appliance, or the like. The electronic device according to the embodiment of the present document is not limited to the above-described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments may be used to refer to various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit including hardware, software, and/or firmware, or any combinations thereof, and may, for example, be used interchangeably with the term "logic", "logical block", "component", "circuit", or the like. The "module" may be an integrated component, or a minimum unit for performing one or more functions or a part thereof. For example, a module may, for example, and without limitation, included an Application-Specific Integrated Circuit (ASIC), or the like.

Various embodiments of the present disclosure may be implemented as software (e.g., program 1640) including instructions stored in a non-transitory machine (e.g., computer)-readable storage media (e.g., internal memory 136 or external memory 138). The machine may be a device that calls the stored instructions from the storage media and is operable according to the called instructions, and may include an electronic device (e.g., the electronic device 101) according to the disclosed embodiments. When the instruction is executed by a processor (e.g., the processor 120), the processor may perform the function corresponding to the instruction using other components directly or under the control of the processor. The instruction may include a code that is generated or executed by a compiler or interpreter. The machine-readable storage media may be provided in the form of non-transitory storage media.

According to an embodiment, the method according to various embodiments disclosed herein may be included in a computer program product to be provided. The computer program product may be traded between a seller and a purchaser as a commodity. The computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be at least temporarily stored or temporarily created on a storage medium such as a manufacturer's server, a server of an application store, or a memory of a relay server.

Each of the components (e.g., module or program) according to various embodiments may include a single entity or a plurality of entities, and some subcomponents of the previously mentioned subcomponents may be omitted, or other subcomponents may be further included in various embodiments. Some components (e.g., modules or programs) may be integrated into one entity to perform functions performed by the corresponding component prior to integration in the same or similar manner. Operations performed by a module, a programming module, or other elements according to various embodiments may be executed sequentially, in parallel, repeatedly, or in a heuristic manner. At least some operations may be executed according to another sequence, may be omitted, or may further include other operations.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments may be executed sequentially, in parallel, repeatedly, or in a heuristic manner. Furthermore, some operations may be executed in a different order or may be omitted, or other operations may be added.

According to various embodiments, in the storage media storing instructions, the instructions are set, when executed by at least one processor, to cause the at least one processor to perform at least one operation, wherein the at least one operation include, in a method of transmitting a relay message from an electronic device to an external vehicle, determining a relay message generation condition associated with a vehicle based at least on data acquired from at least one sensor or at least one communication circuit; generating the relay message based at least on the data acquired from the at least one sensor or the at least one communication circuit, when the relay message generation condition is satisfied based on the determination result; and transmitting the generated relay message to the external vehicle through the at least one communication circuit.

As described above, in a method of transmitting a message associated with a vehicle from an electronic device transmits to an external vehicle according to various embodiments and an electronic device thereof, it is possible to generate a relayable vehicle-related message in each vehicle and transmit the generated relayable message to an external vehicle, thereby efficiently transmitting the vehicle-related message to a remote vehicle.

The embodiments disclosed in the specification and the drawings are only illustrative examples proposed in order to easily describe the technical matters of the present disclosure and aid in comprehension of the present disclosure, and do not limit the scope of the present disclosure. Therefore, in addition to the embodiments disclosed herein, the scope of the various embodiments should be understood to include all modifications or modified forms drawn based on the technical idea of the various embodiments.

What is claimed is:

1. An electronic device configured to be provided in a first vehicle, the electronic device comprising:
   at least one sensor configured to be provided in the first vehicle;
   communication circuitry; and
   a processor electrically connected to the at least one sensor and/or the communication circuitry,
   wherein the processor is configured to:
   receive a basic safety message (BSM) from a second vehicle through the communication circuitry, the BSM comprising a relay field including message content and relay condition information,
   in response to identifying the BSM being a first relay message from information included in the BSM, identify a relay message generation condition associated with the first vehicle based at least in part on data acquired from the at least one sensor and the relay condition information contained in the relay field of the BSM,
   provide a second relay message to be re-transmitted based at least in part on the acquired data, which includes the message content from the relay field of the BSM, when the relay message generation condition is satisfied, and
   transmit the second relay message from the first vehicle to a third vehicle through the communication circuitry.

2. The electronic device of claim 1, wherein the data acquired from the at least one sensor includes at least one of: information about at least one external vehicle adjacent to the electronic device, information about an object loaded on the at least one external vehicle adjacent to the electronic device, information about a state of a road on which the electronic device is located, and information about weather in an area in which the electronic device is located.

3. The electronic device of claim 2, wherein
   the at least one sensor includes an image sensor included in a camera module, and
   the data acquired from the at least one sensor includes state information of a road identified from data collected through the image sensor.

4. The electronic device of claim 1, wherein the data acquired from the communication circuitry includes basic safety message (BSM) data transmitted from the at least one external vehicle adjacent to the electronic device or personal safety message (PSM) data transmitted from at least one external electronic device.

5. The electronic device of claim 1, wherein the second relay message includes at least one of: relay condition information about the second relay message, message content information, and location information of the electronic device.

6. The electronic device of claim 5, wherein the relay condition information includes at least one of: a relay frequency, a distance, a time, and a movement direction.

7. The electronic device of claim 1, wherein the second relay message is configured using a BSM of a society of automotive engineers (SAE) standard.

8. An electronic device configured to be provided in a first vehicle, the electronic device comprising:
   communication circuitry; and
   a processor electrically connected to the communication circuitry,
   wherein the processor is configured to:
   receive a basic safety message (BSM) from a second vehicle through the communication circuitry, the BSM comprising a relay field including message content and relay condition information,
   identify that the BSM is a first relay message from information included in the BSM,
   in response to identifying the BSM being the first relay message, identify whether a relay condition included in the BSM is satisfied based at least on the relay condition information contained in the relay field of the BSM,
   provide a second relay message to be re-transmitted based on the received BSM when the relay condition is satisfied, the second relay message including the message content from the relay field of the BSM, and
   transmit the second relay message from the first vehicle to a third vehicle through the communication circuitry.

9. The electronic device of claim 8, wherein the processor is configured to:
   identify whether the relay condition included in the BSM is satisfied based at least on information associated with the electronic device, and
   update relay-related information included in the received BSM to provide the second relay message when the relay condition is satisfied.

10. The electronic device of claim 9, wherein the processor is configured to display a notification message on a display, to output a sound, and/or to control a designated function of a vehicle, based on the relay-related information included in the received BSM.

11. The electronic device of claim 8, wherein the second relay message transmitted to the third vehicle is configured using a BSM of an SAE standard.

12. The electronic device of claim 8, wherein the relay condition includes at least one of: a relay frequency, a distance, a time, and a movement direction.

13. The electronic device of claim 8, wherein the processor is configured to transmit the second relay message after a time randomly set by the electronic device.

14. A method of transmitting a relay message from an electronic device in a first vehicle to an external vehicle, the method comprising:
   receiving a basic safety message (BSM) from a second vehicle through the communication circuitry, the BSM comprising a relay field including message content and relay condition information;

in response to identifying the BSM being a first relay message from information included in the BSM, identifying a relay message generation condition associated with the first vehicle based at least on data acquired from at least one sensor and the relay condition information contained in the relay field of the BSM;

providing a second relay message based at least on the data the relay message generation condition is satisfied, the second relay message including the message content from the relay field of the BSM; and transmitting the second generated relay message from the first vehicle to a third vehicle through the communication circuitry.

15. The method of claim 14, wherein the data acquired from the at least one sensor includes at least one of: information about at least one external vehicle adjacent to the electronic device, information about an object loaded on the at least one external vehicle adjacent to the electronic device, information about a state of a road on which the electronic device is located, and information about weather in an area in which the electronic device is located.

16. The method of claim 15, wherein the data acquired from the at least one sensor includes state information of a road identified from data collected through an image sensor included in a camera module.

17. The method of claim 14, wherein the data acquired from the communication circuitry includes BSM data transmitted from the at least one external vehicle adjacent to the electronic device or PSM data transmitted from at least one external electronic device.

18. The method of claim 14, wherein the second relay message includes at least one of: relay condition information about the relay message, message content information, and location information of the electronic device.

19. The method of claim 18, wherein the relay condition information includes at least one of: a relay frequency, a distance, a time, and a movement direction.

20. The method of claim 14, wherein the second relay message is configured using a BSM of an SAE standard.

* * * * *